(12) United States Patent
Ahn et al.

(10) Patent No.: US 12,527,319 B2
(45) Date of Patent: Jan. 20, 2026

(54) COMPOSITION FOR CRYOPROTECTION INCLUDING DNA NANOSTRUCTURE, AND METHOD FOR USING SAME

(71) Applicants: KOREA UNIVERSITY RESEARCH AND BUSINESS FOUNDATION, Seoul (KR); SEOUL NATIONAL UNIVERSITY R&DB FOUNDATION, Seoul (KR)

(72) Inventors: Dong June Ahn, Seoul (KR); Do Nyun Kim, Seoul (KR); Ye Dam Lee, Seoul (KR); Chan Seok Lee, Seoul (KR)

(73) Assignees: KOREA UNIVERSITY RESEARCH AND BUSINESS FOUNDATION, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 649 days.

(21) Appl. No.: 17/928,889

(22) PCT Filed: Mar. 12, 2021

(86) PCT No.: PCT/KR2021/003087
§ 371 (c)(1),
(2) Date: Nov. 30, 2022

(87) PCT Pub. No.: WO2022/119054
PCT Pub. Date: Jun. 9, 2022

(65) Prior Publication Data
US 2023/0225310 A1 Jul. 20, 2023

(30) Foreign Application Priority Data
Dec. 4, 2020 (KR) .................. 10-2020-0168844

(51) Int. Cl.
*A01N 1/162* (2025.01)
*A01N 1/125* (2025.01)
*A01N 1/128* (2025.01)

(52) U.S. Cl.
CPC ............. *A01N 1/162* (2025.01); *A01N 1/125* (2025.01); *A01N 1/128* (2025.01)

(58) Field of Classification Search
CPC ........ A01N 1/162; A01N 1/125; A01N 1/128; C12N 5/525; C12N 15/113; C12N 2310/3181; C12N 1/04; A23B 2/762; A23B 2/771; C07K 7/06
See application file for complete search history.

(56) References Cited

U.S. PATENT DOCUMENTS 6,307,020 B1 10/2001 Hew et al.

FOREIGN PATENT DOCUMENTS

| JP | 2017-503845 A | 2/2017 |
|----|---------------|--------|
| KR | 10-2015-0137440 A | 12/2015 |
| KR | 10-2016-0049114 A | 5/2016 |
| KR | 10-2018-0084782 A | 7/2018 |
| KR | 10-2018-0107887 A | 10/2018 |
| KR | 10-2018-0109237 A | 10/2018 |
| KR | 10-2018-0109267 A | 10/2018 |
| KR | 10-2020-0118552 A | 10/2020 |
| WO | 91/10361 A1 | 7/1991 |
| WO | 92/12722 A1 | 8/1992 |

OTHER PUBLICATIONS

Xin Y, et al "Cryopreservation of DNA Origami Nanostructures" Small, Apr. 2020 (Epub Mar. 4, 2020);16(13):e1905959, 7 pages; PMID 32130783; doi: 10.1002/smll.201905959). (Year: 2020).*
Japanese Office Action dated Oct. 10, 2023 in Japanese Application No. 2022-573705.
Saccà et al., "Orthogonal Protein Decoration of DNA Origami**", Agnew. Chem., 2010, vol. 122, pp. 9568-9573 (6 pages total).
Xin et al., "Cryopreservation of DNA Origami Nanostructures", Small, 2010, vol. 16, pp. 1-7 (8 pages total).
Office Action issued Mar. 27, 2024 in Chinese Application No. 202180047884.4.
International Search Report for PCT/KR0201/003087, dated Aug. 27, 2021.
Chanseok Lee, et al., " Peptide-DNA Origami as a cryoprotectant for cell preservation" Science Advances, Oct. 28, 2022, vol. 8, pp. 1-13 (13 pages).
European Search Report dated Aug. 22, 2025 in Application No. 21 900 742.4.

* cited by examiner

*Primary Examiner* — Aaron J Kosar
(74) *Attorney, Agent, or Firm* — Sughrue Mion, PLLC

(57) ABSTRACT

The present invention relates to a composition for cryopreservation, comprising: a nucleic acid structure which comprises a scaffold nucleic acid folded at predetermined positions to form multiple strands, and a plurality of staple nucleic acids wherein at least a portion of a sequence thereof comprises a complementary sequence to that of the scaffold nucleic acid, which are bound to at least one of the strands of the scaffold nucleic acid to form a double strand; linkers coupled to at least one of single strands in the nucleic acid structure; and an anti-freezing peptide coupled to at least one of the linkers, so as to exhibit excellent freeze-protection effects, which in turn increase cell viability during cryopreservation of cells and tissues, while retaining original texture of food even when used for freezing the food.

11 Claims, 31 Drawing Sheets

[FIG. 1]
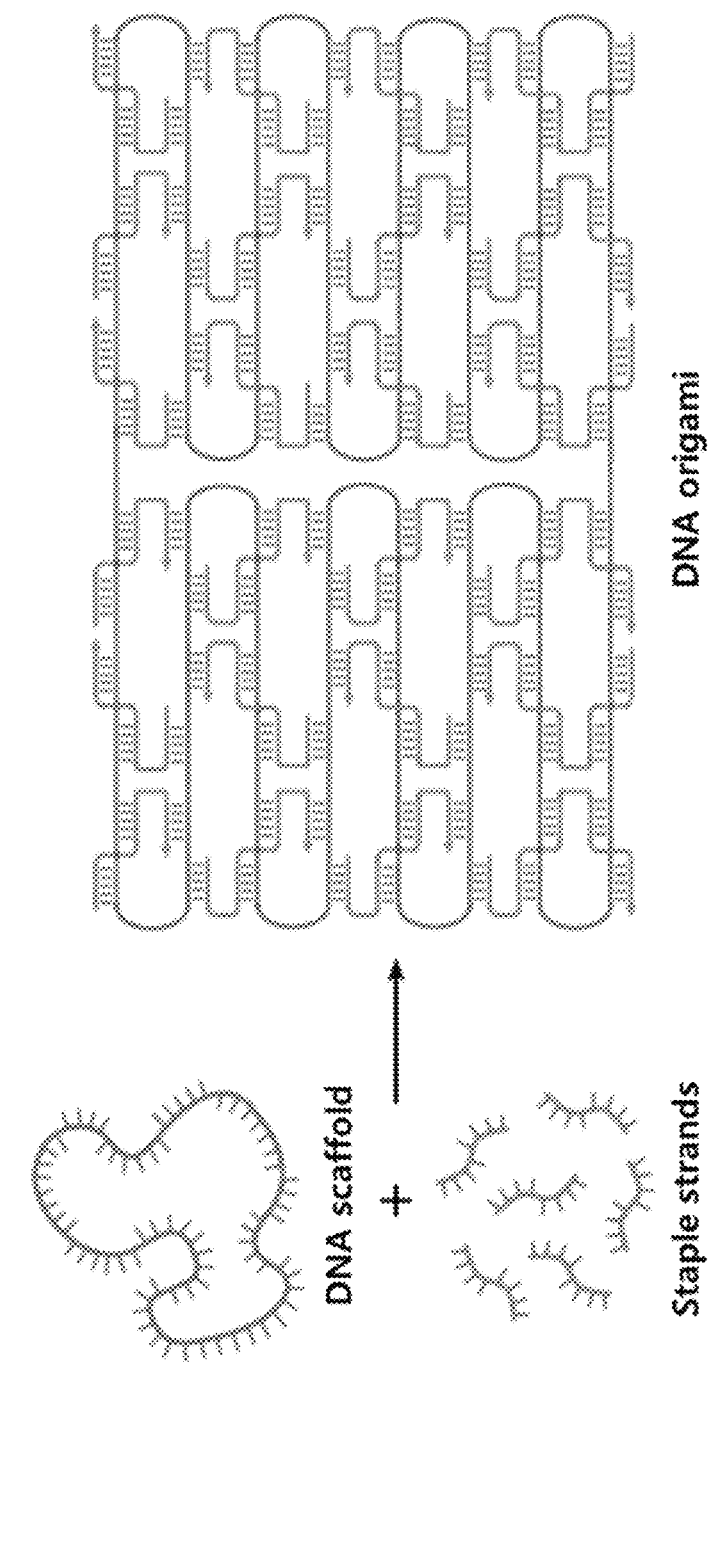

[FIG. 2]
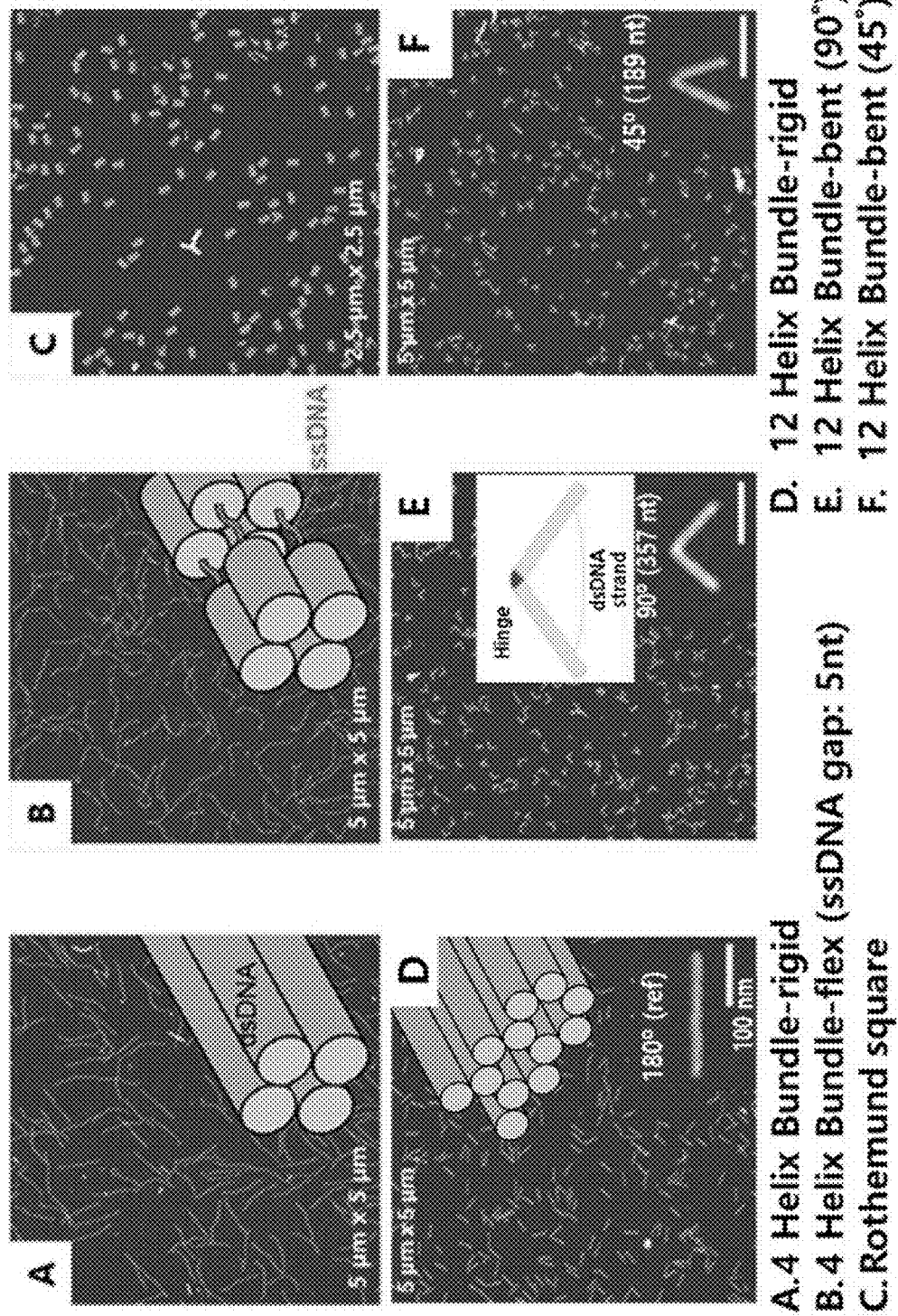

[FIG. 3]
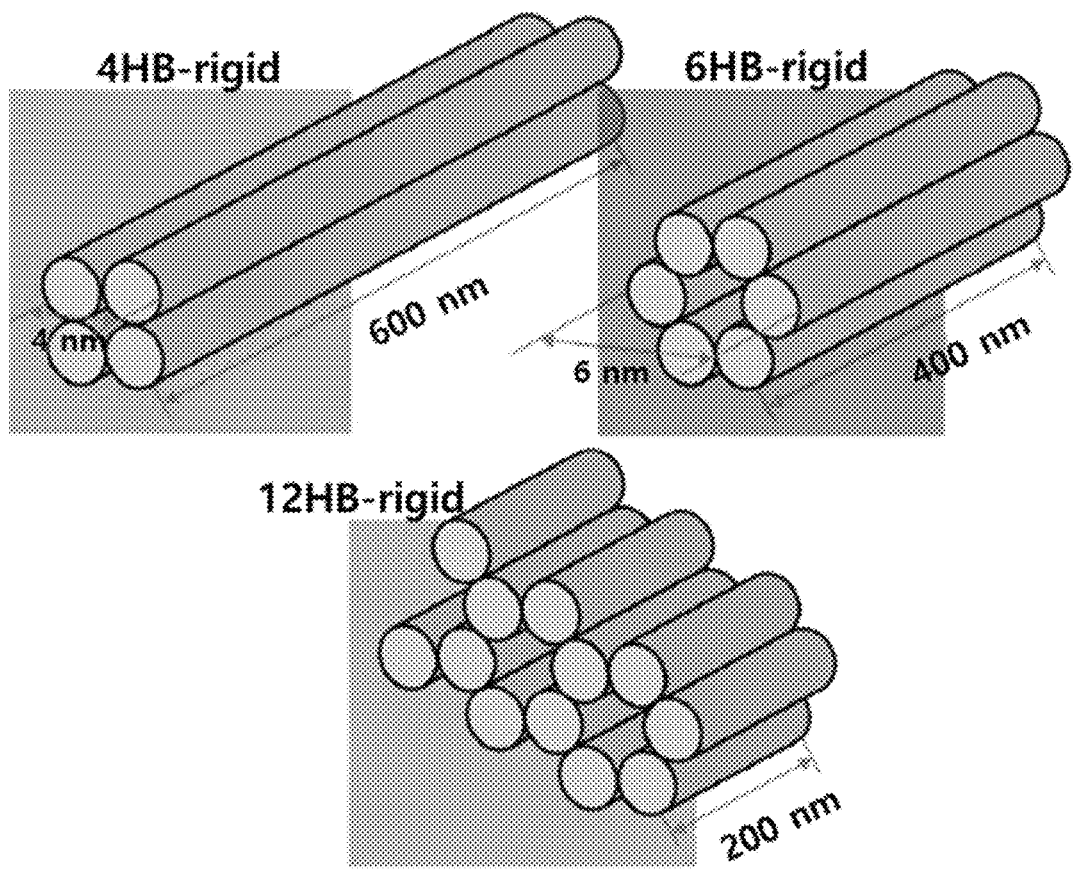

[FIG. 4]
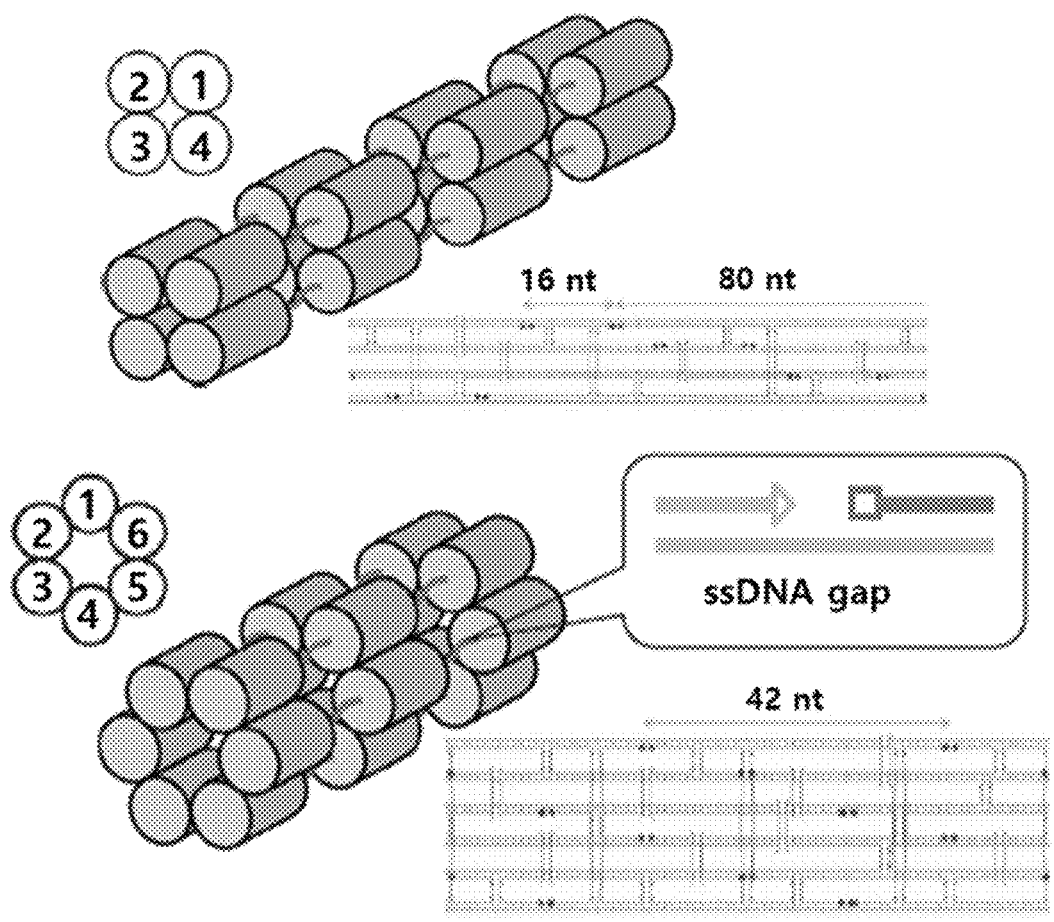

[FIG. 5]
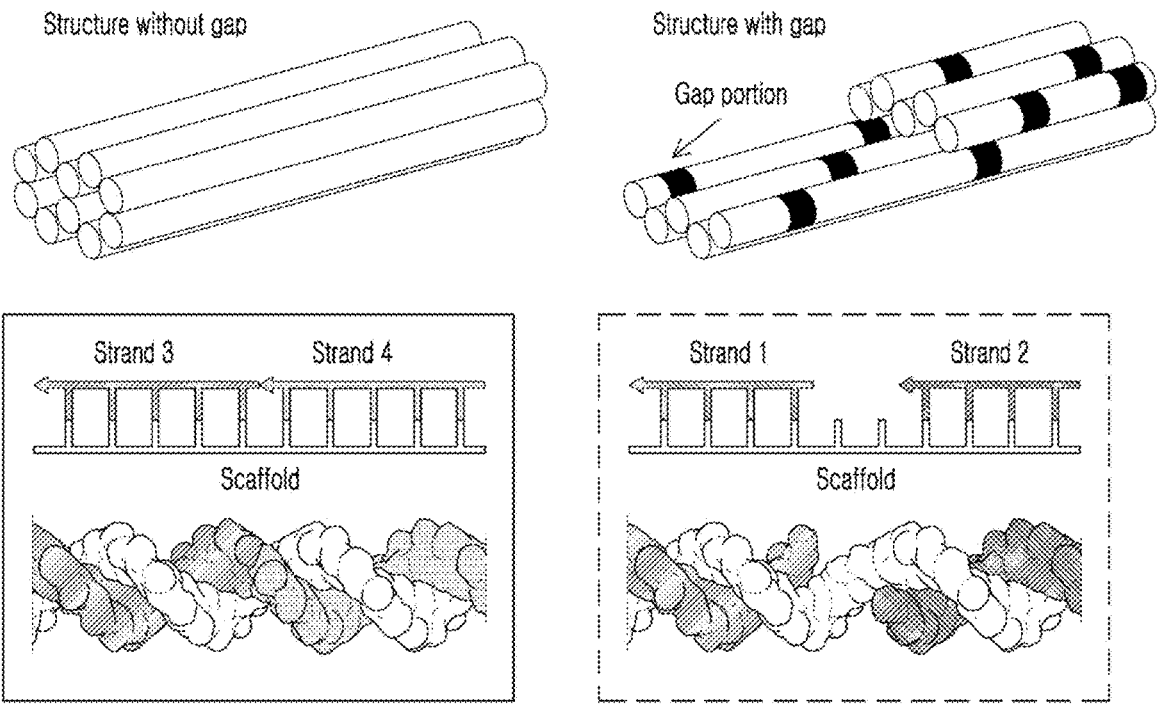

[FIG. 6]
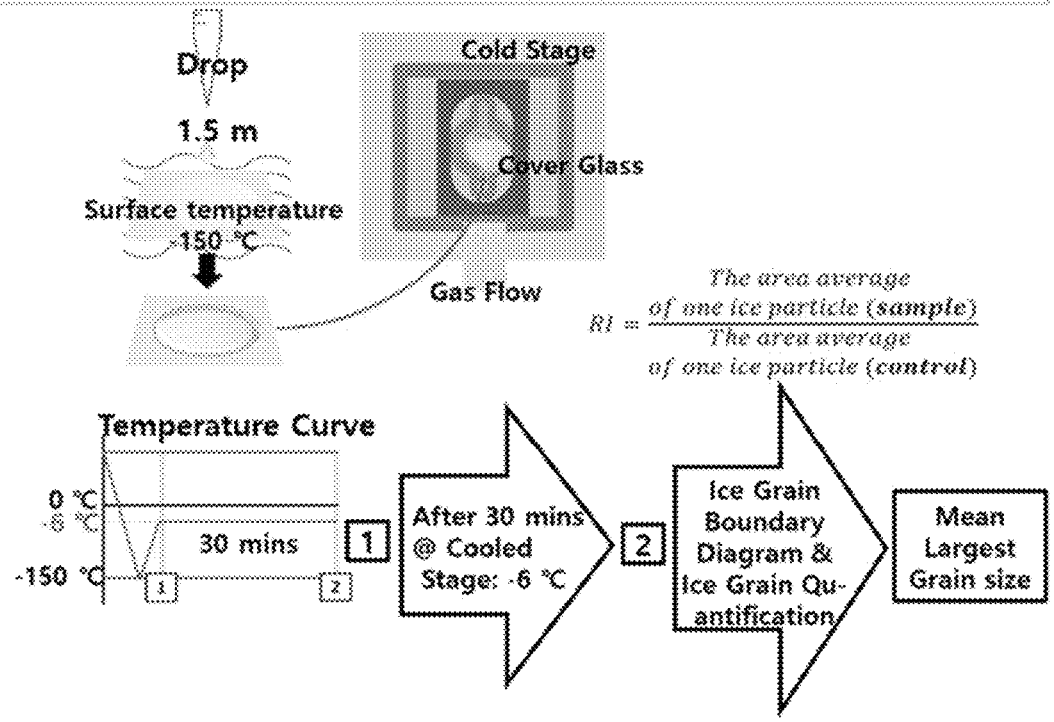

[FIG. 7]
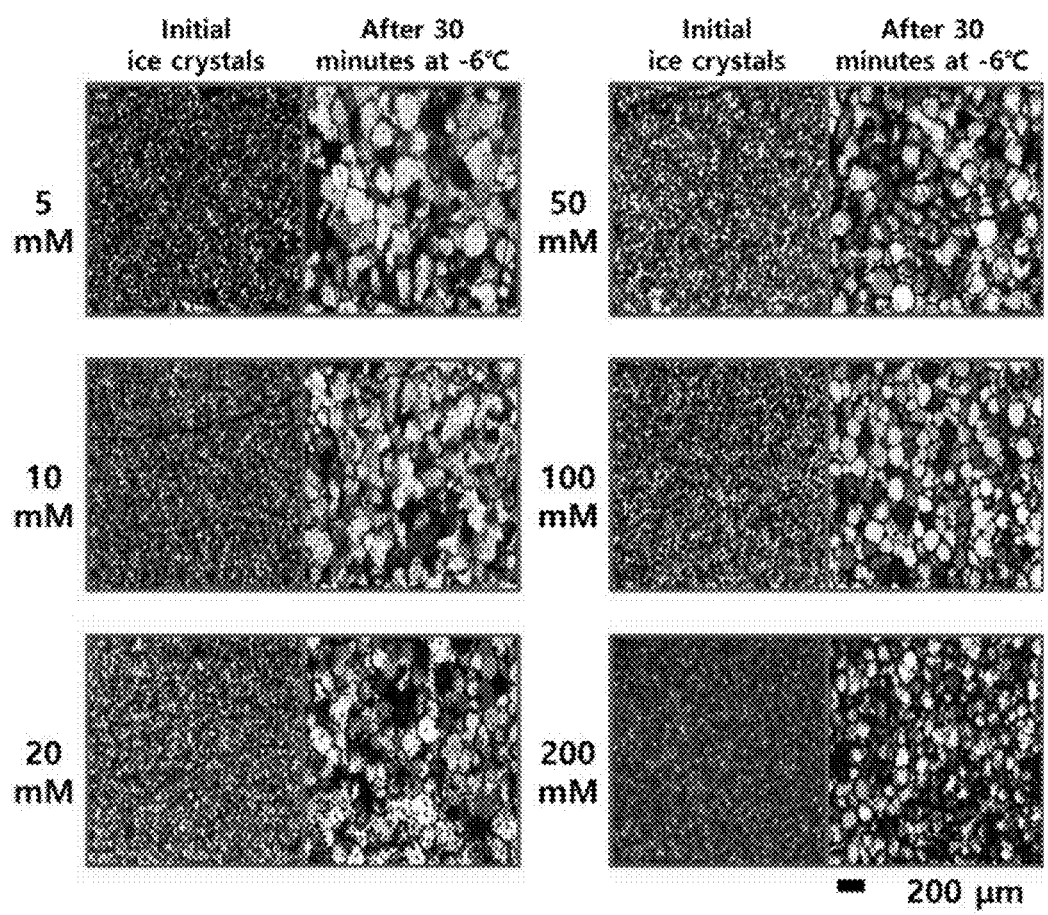

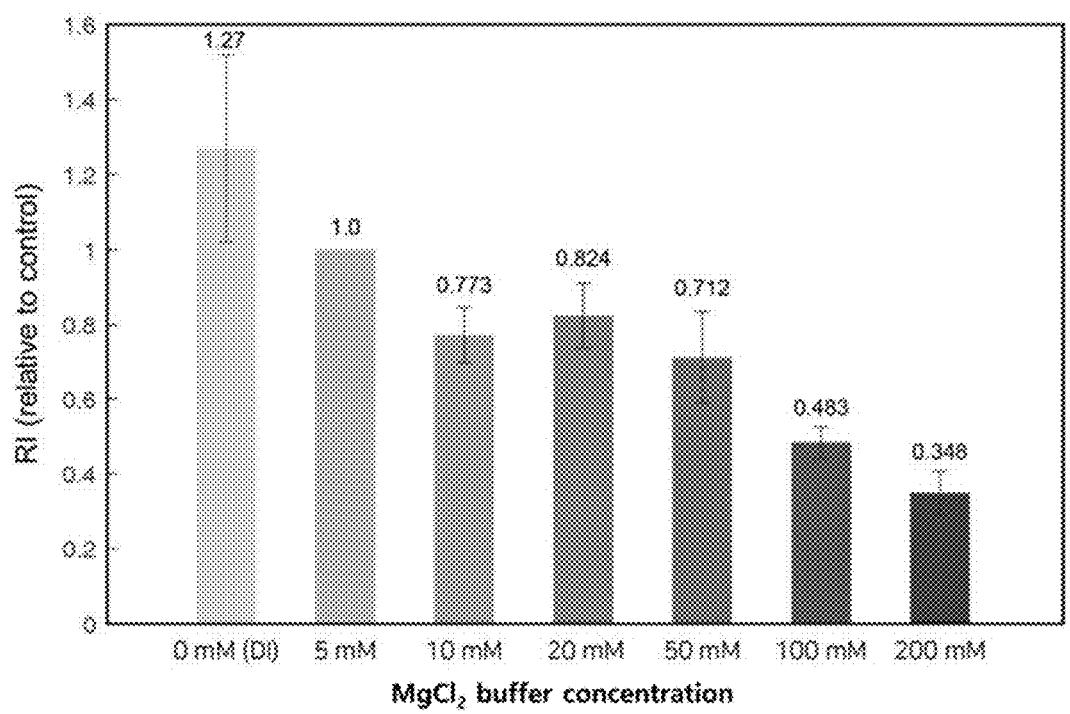
[FIG. 8]

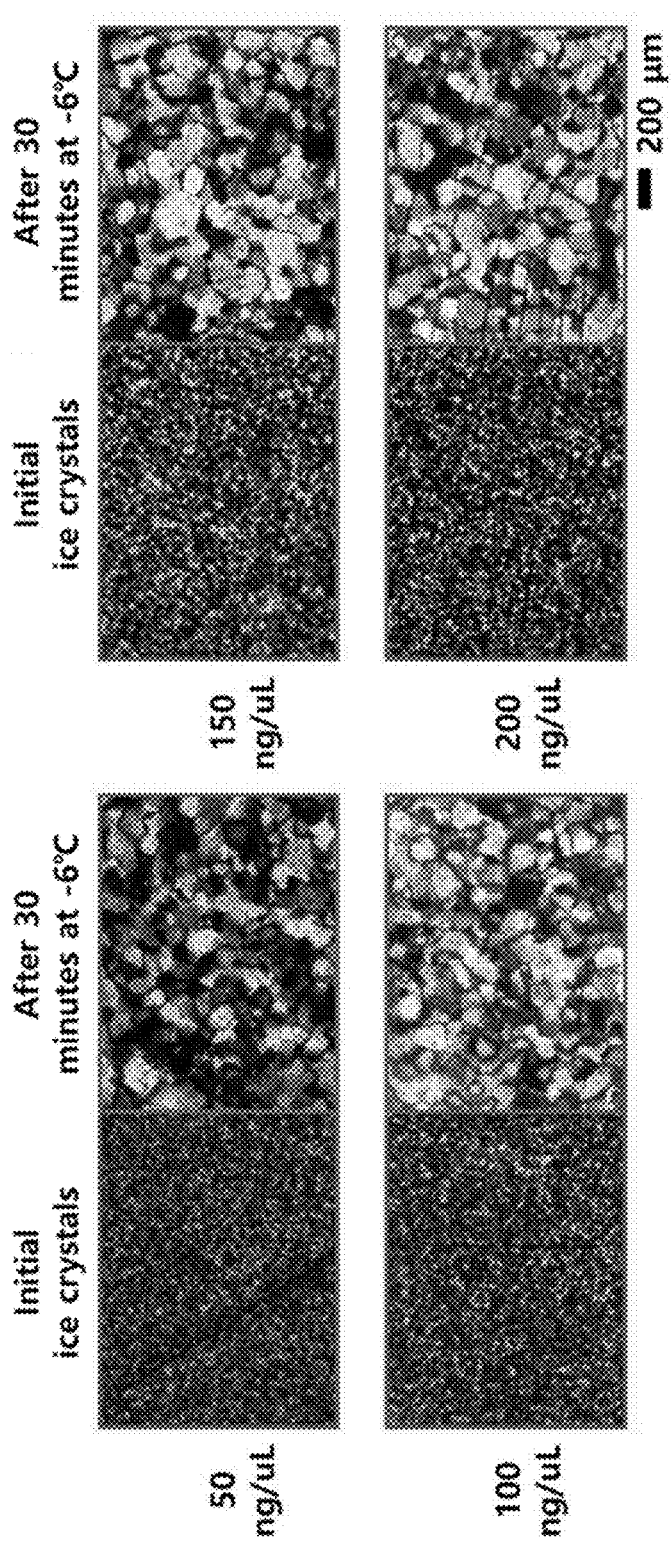
[FIG. 9]

[FIG. 10]
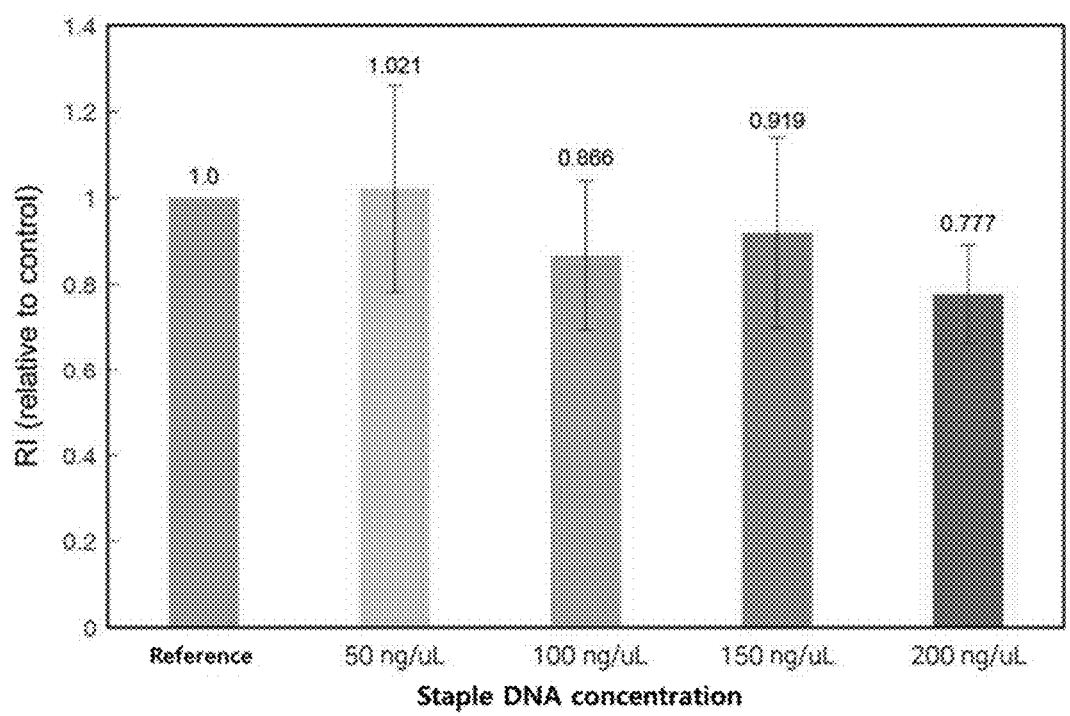

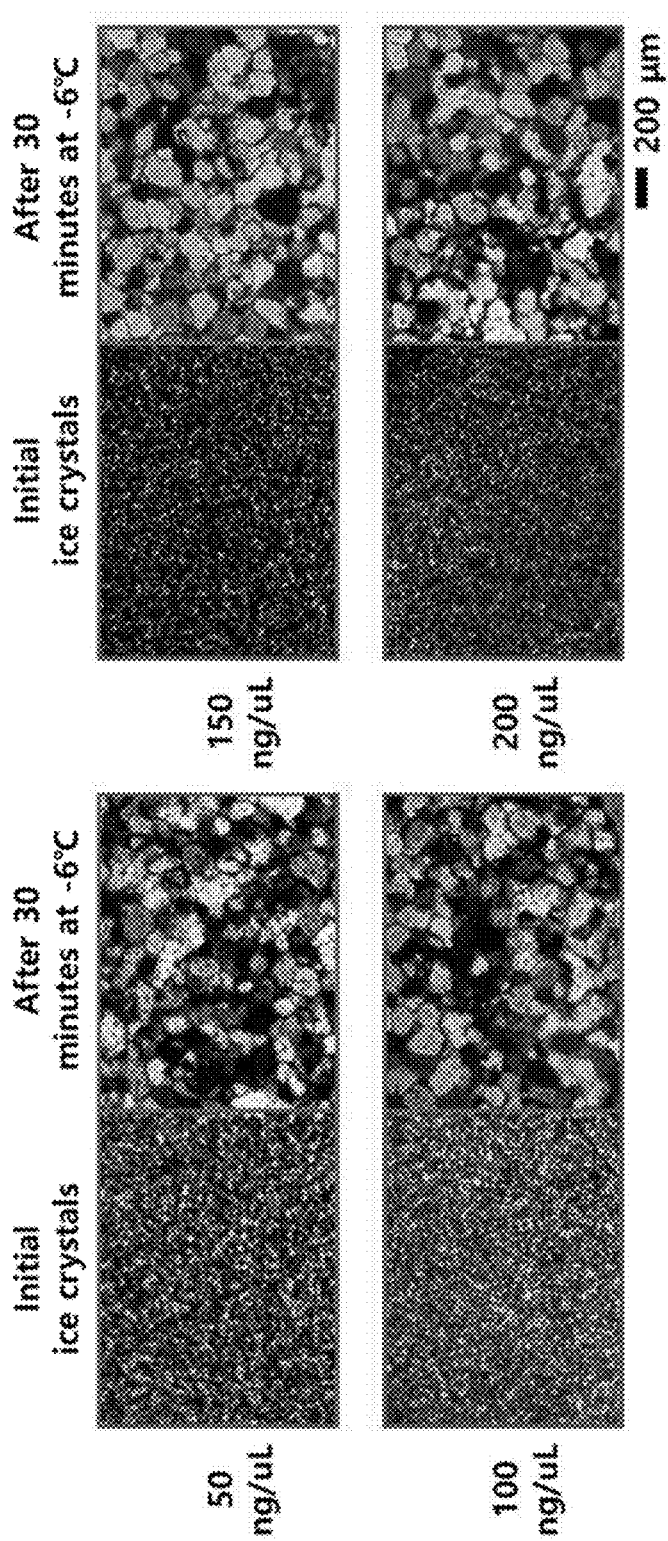
[FIG. 11]

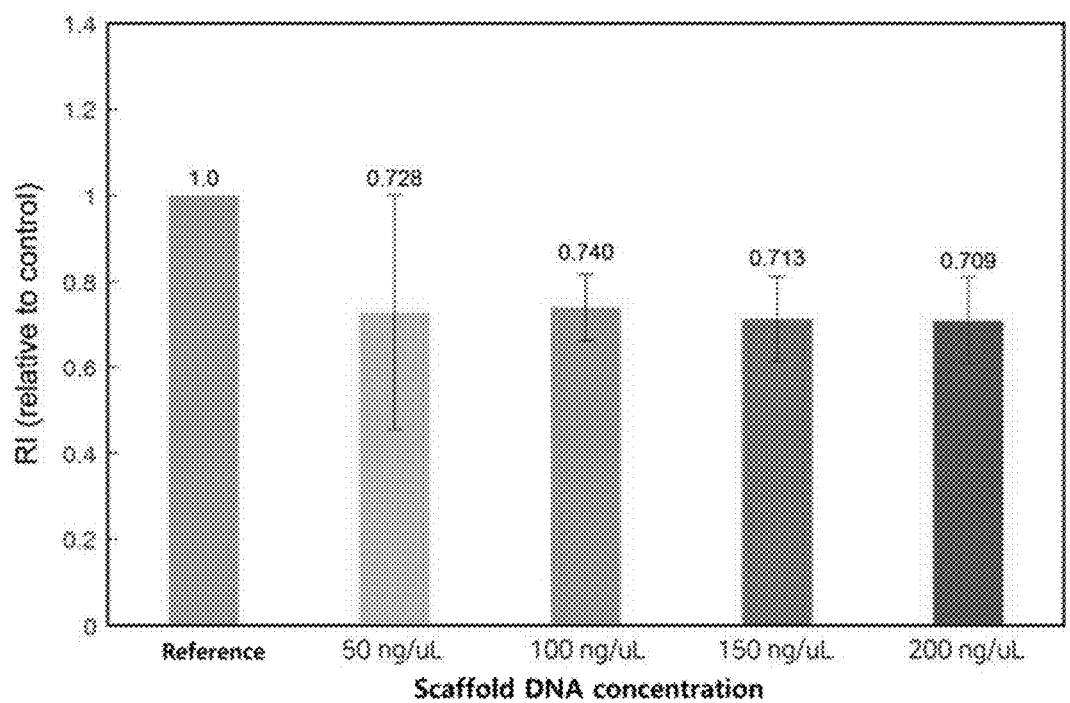
[FIG. 12]

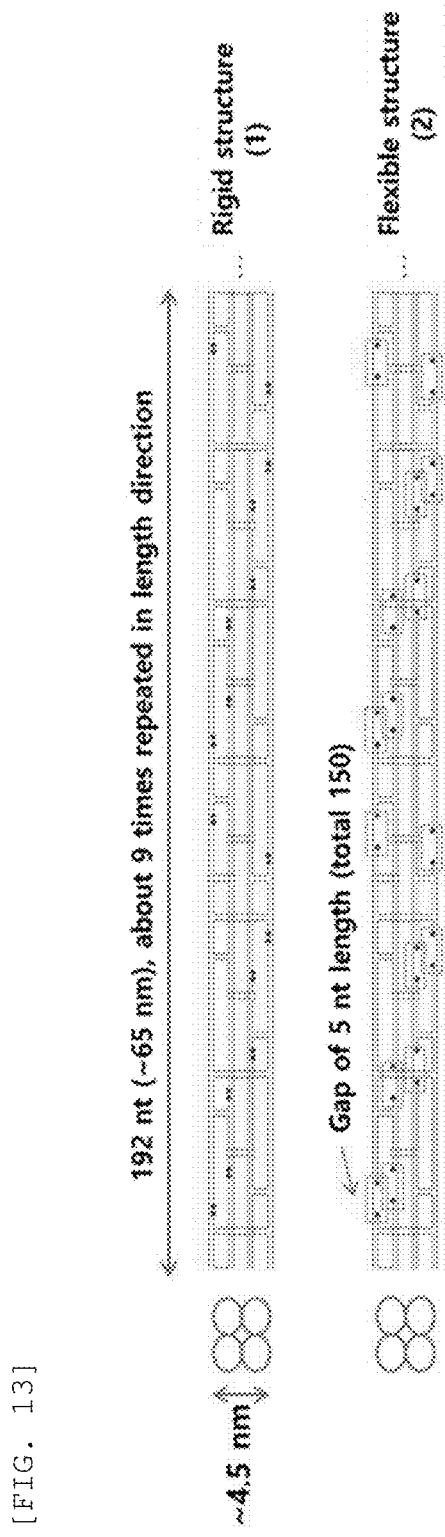
[FIG. 13]

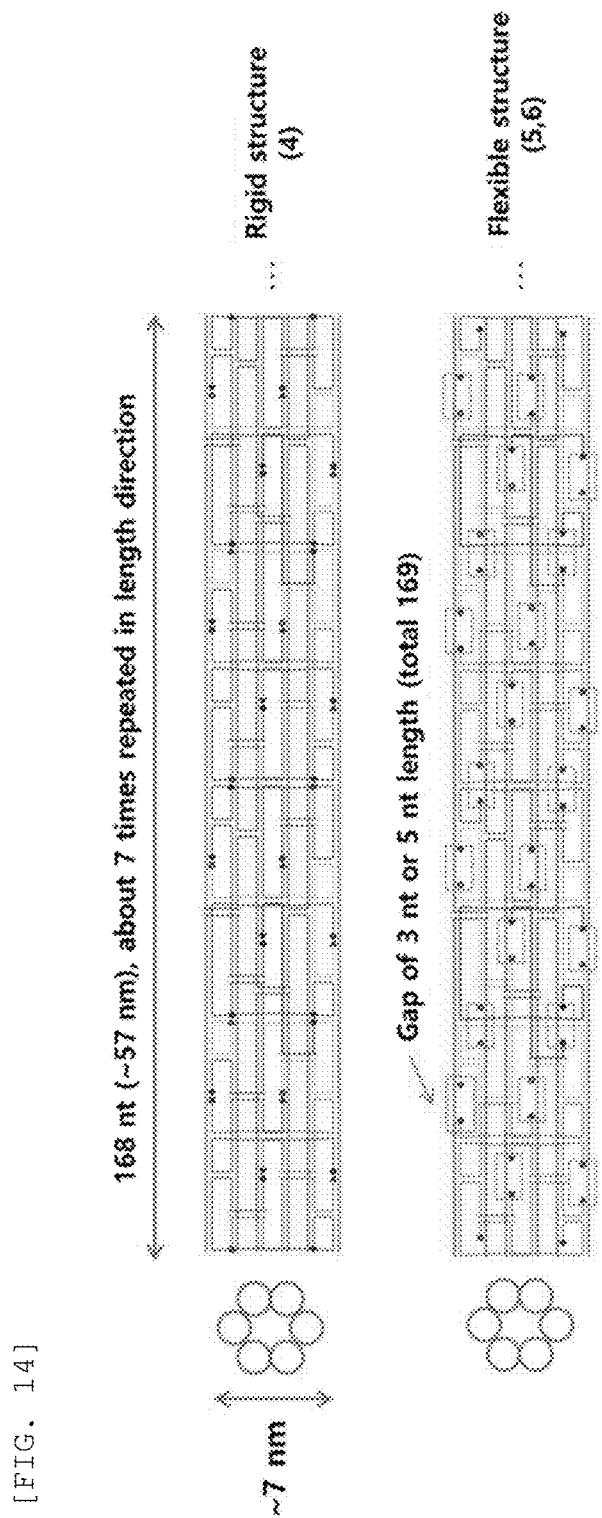
[FIG. 14]

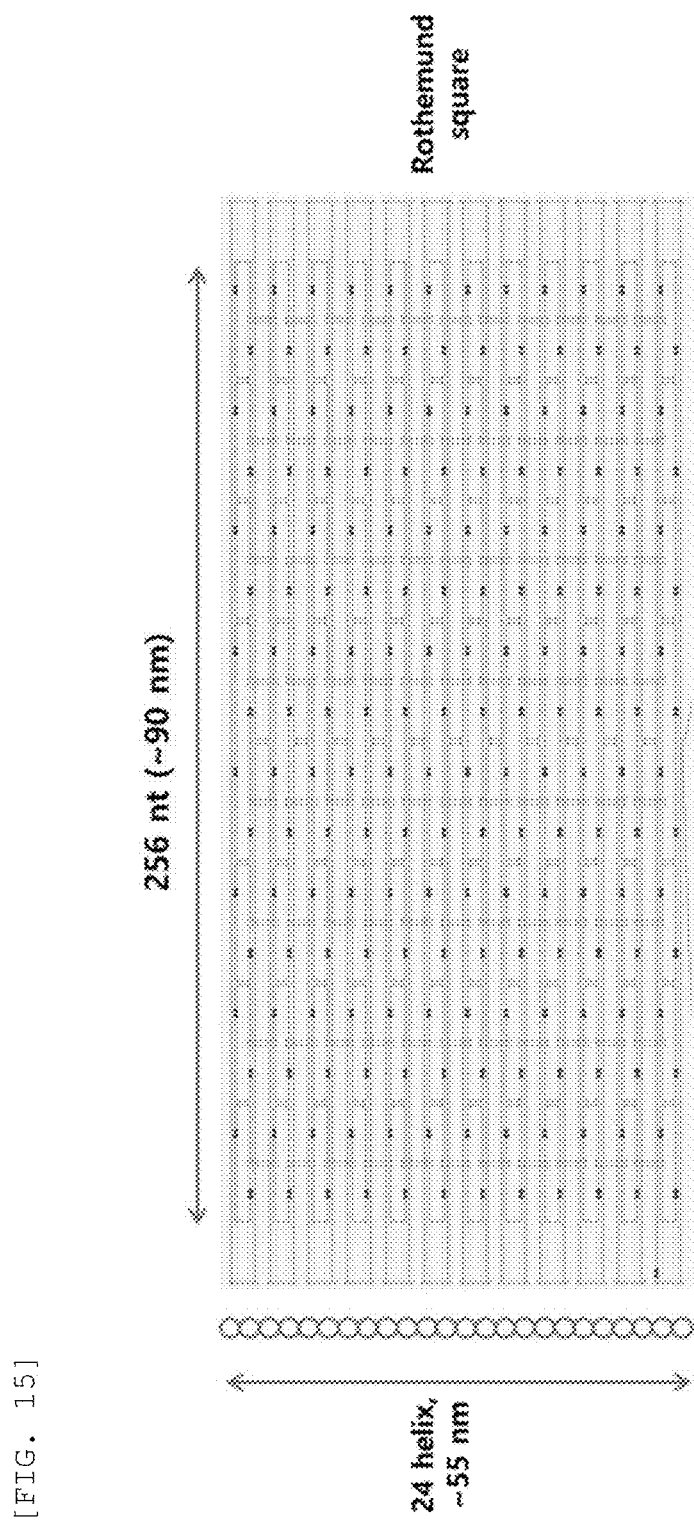
[FIG. 15]

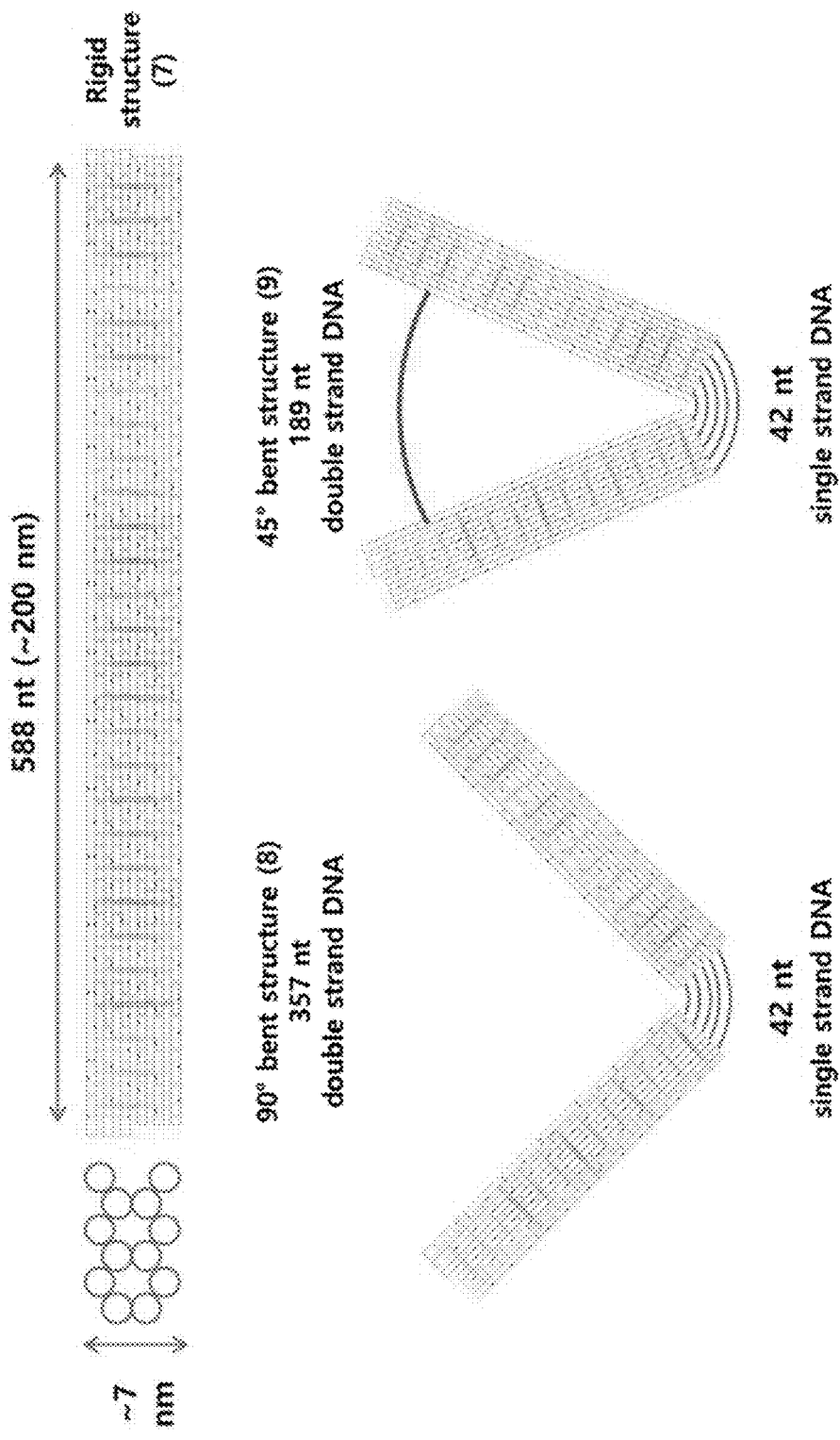
[FIG. 16]

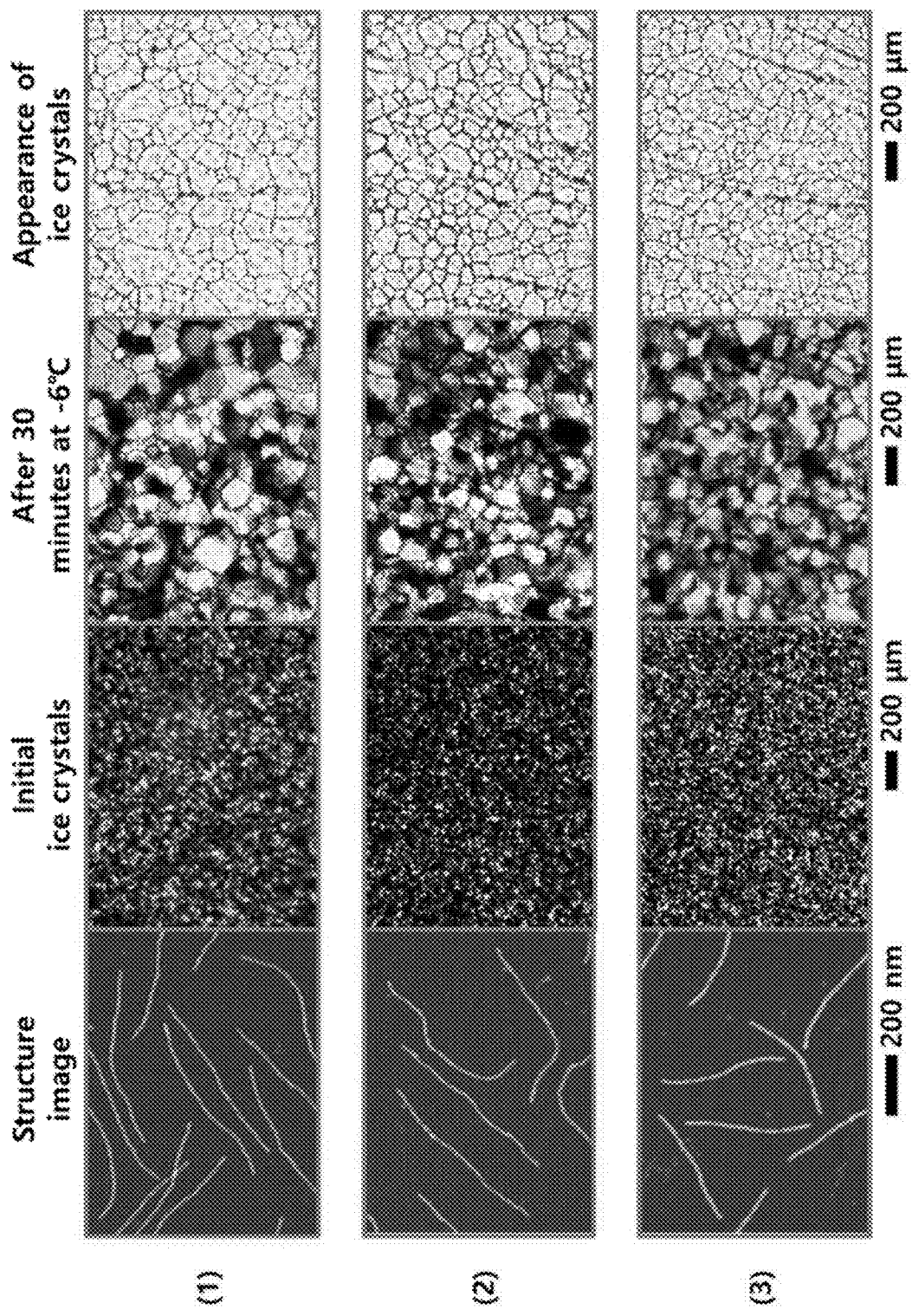
[FIG. 17]

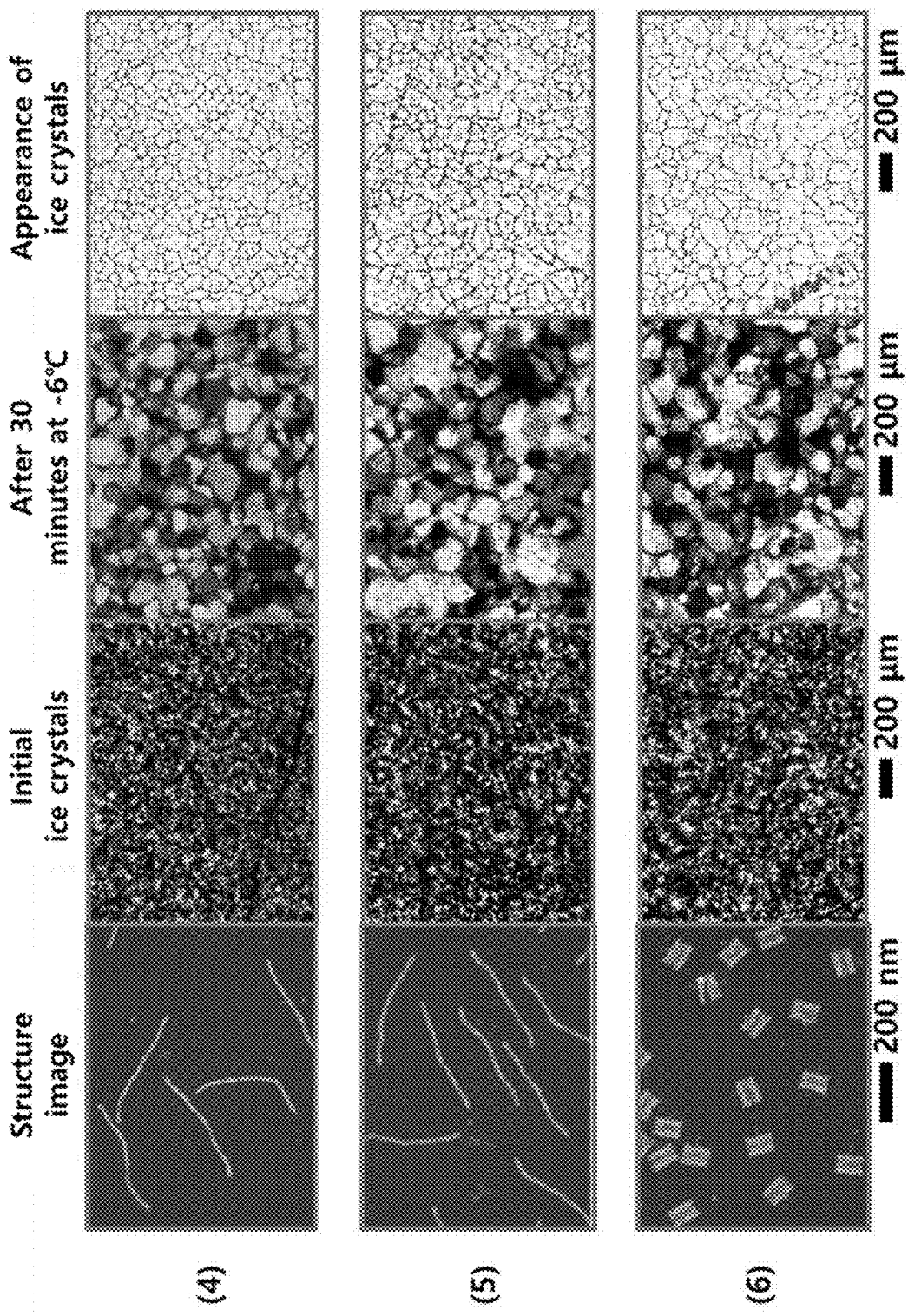
[FIG. 18]

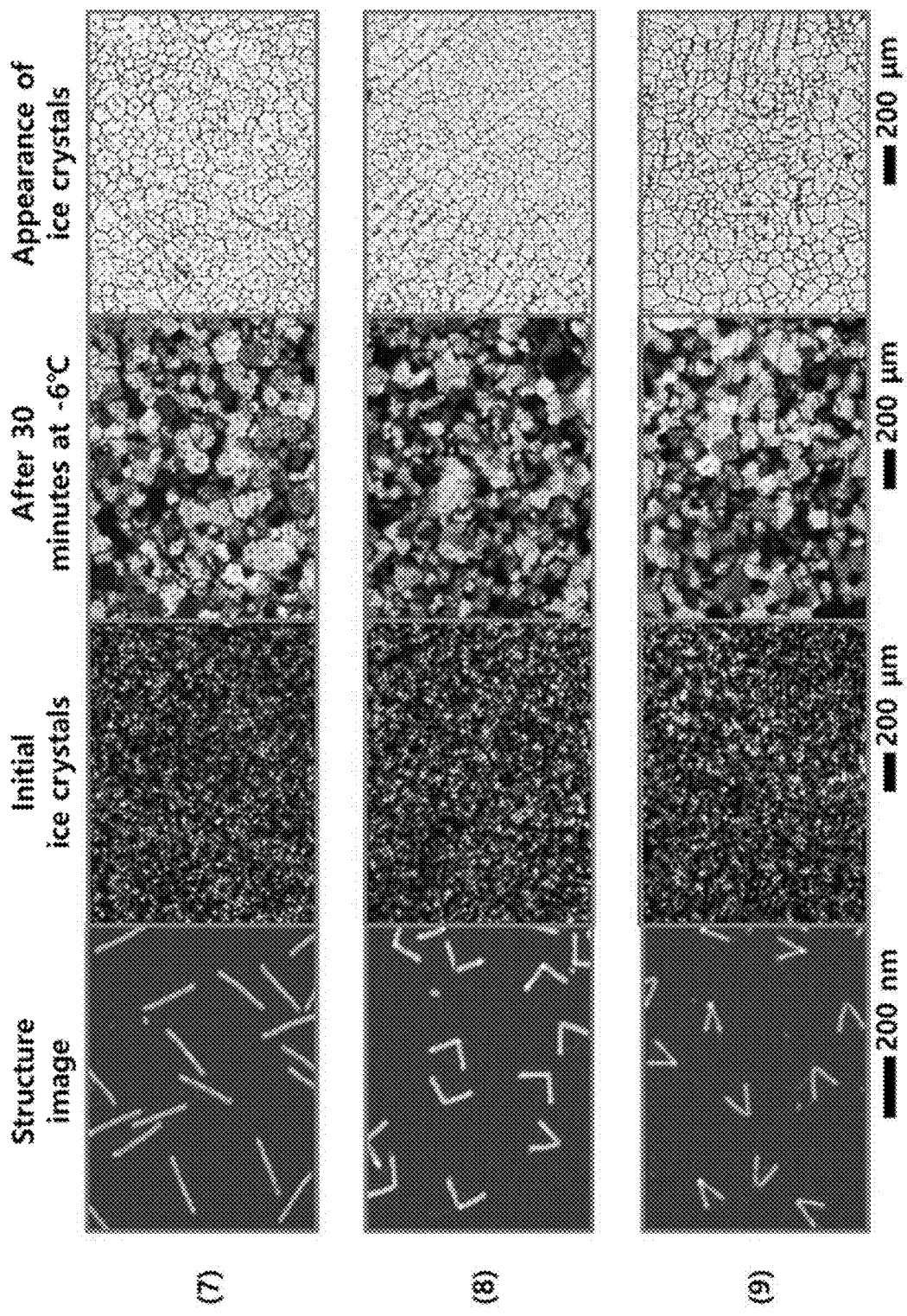
[FIG. 19]

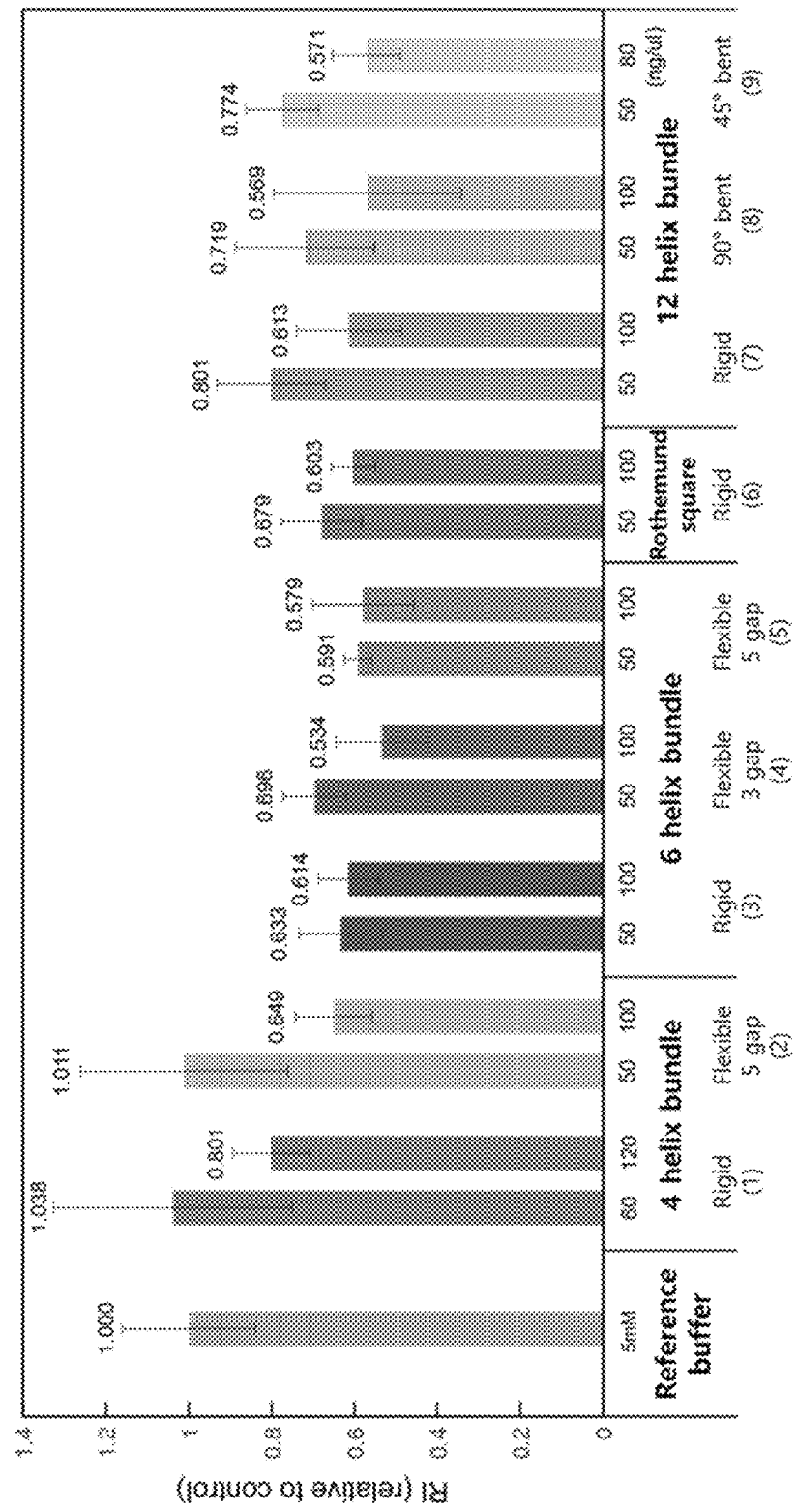
[FIG. 20]

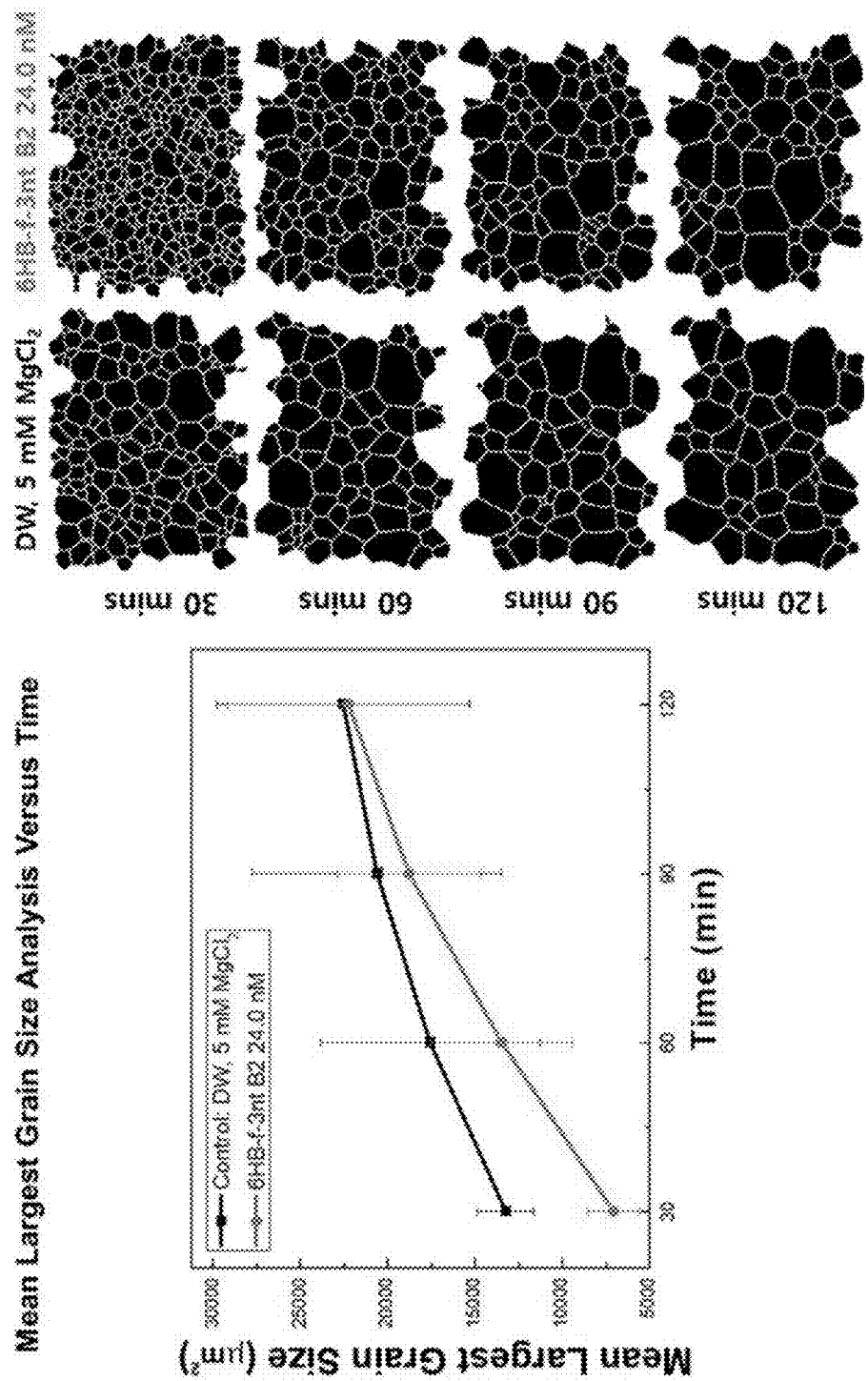
[FIG. 21]

[FIG. 22]
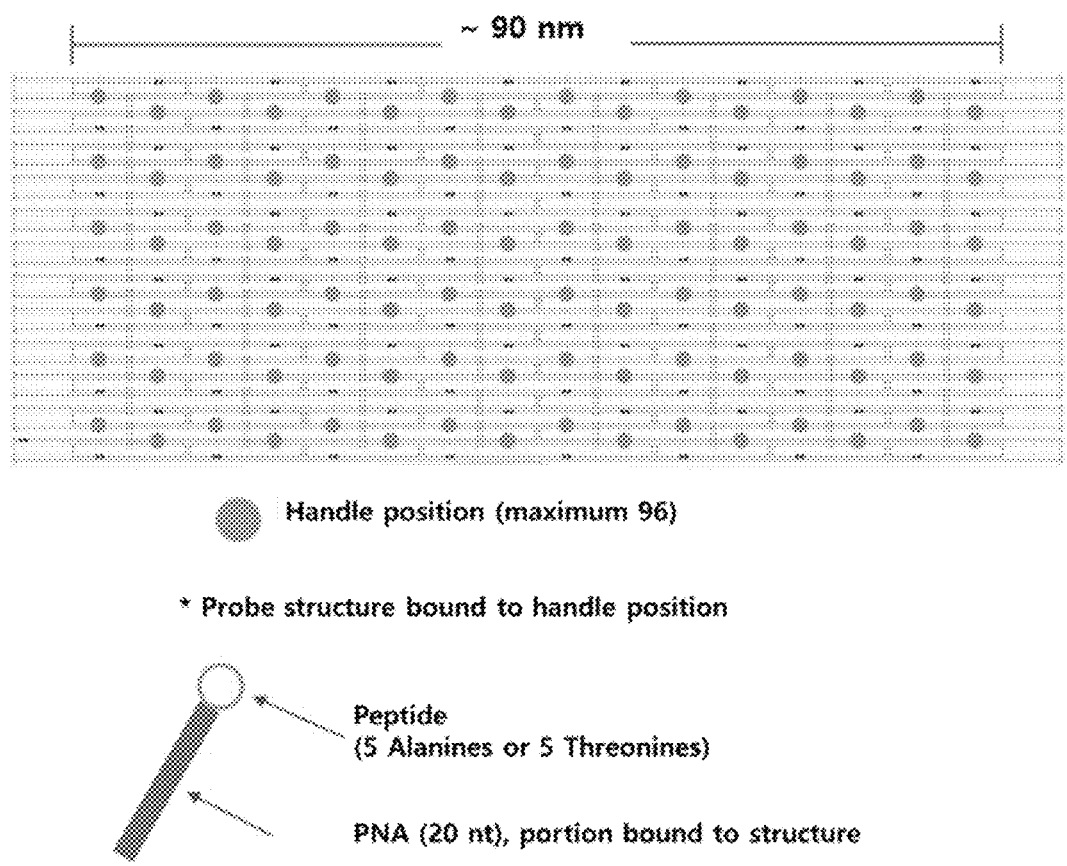

[FIG. 23]
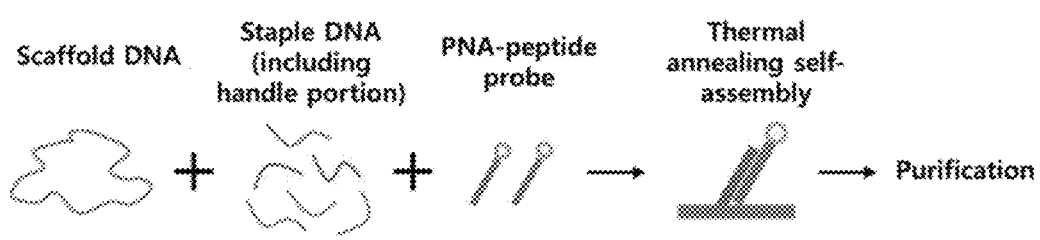
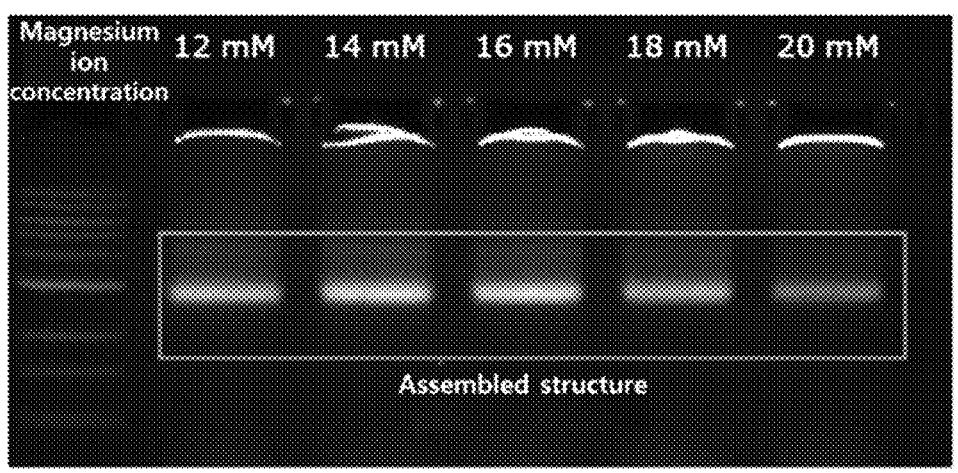

[FIG. 24]
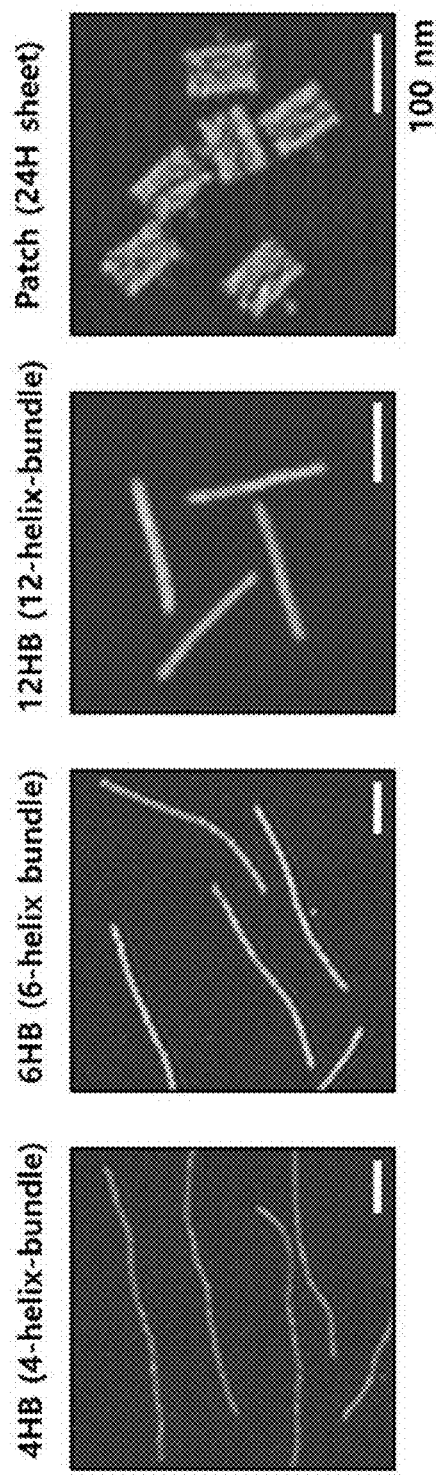

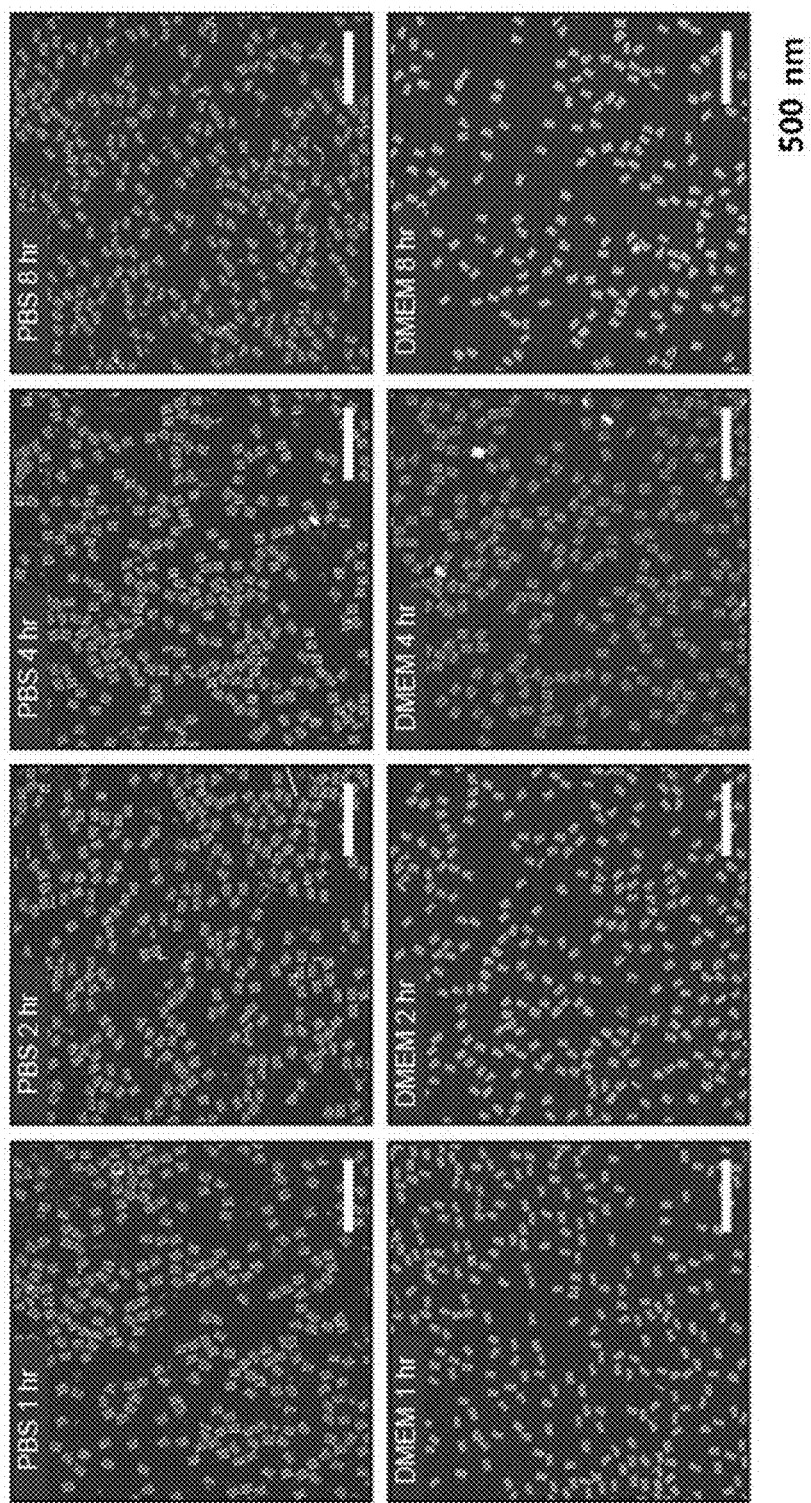
[FIG. 25]

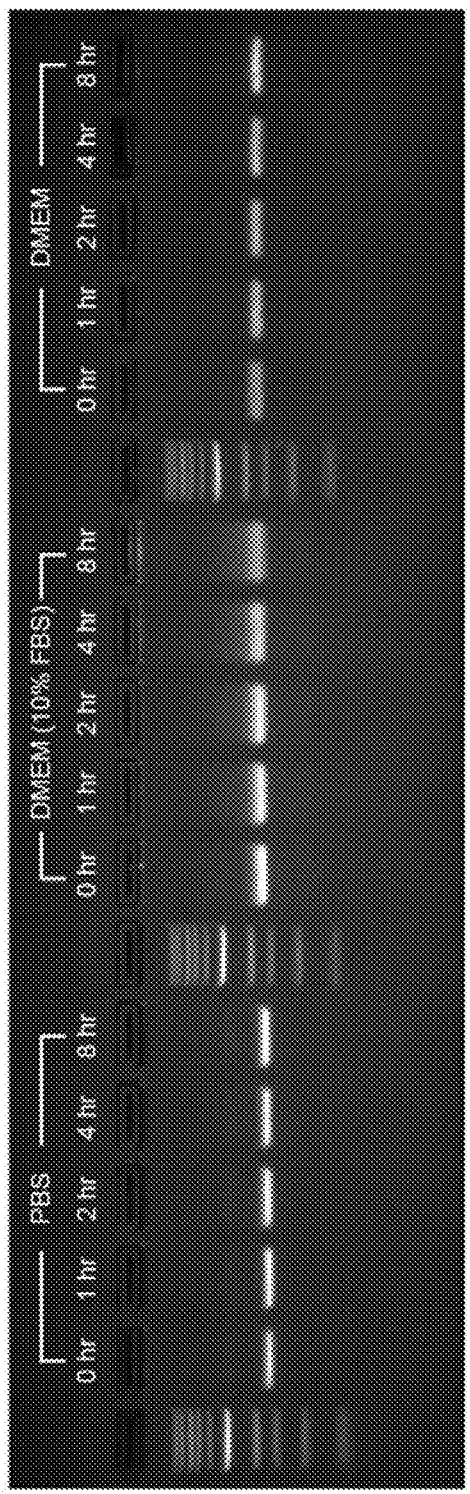
[FIG. 26]

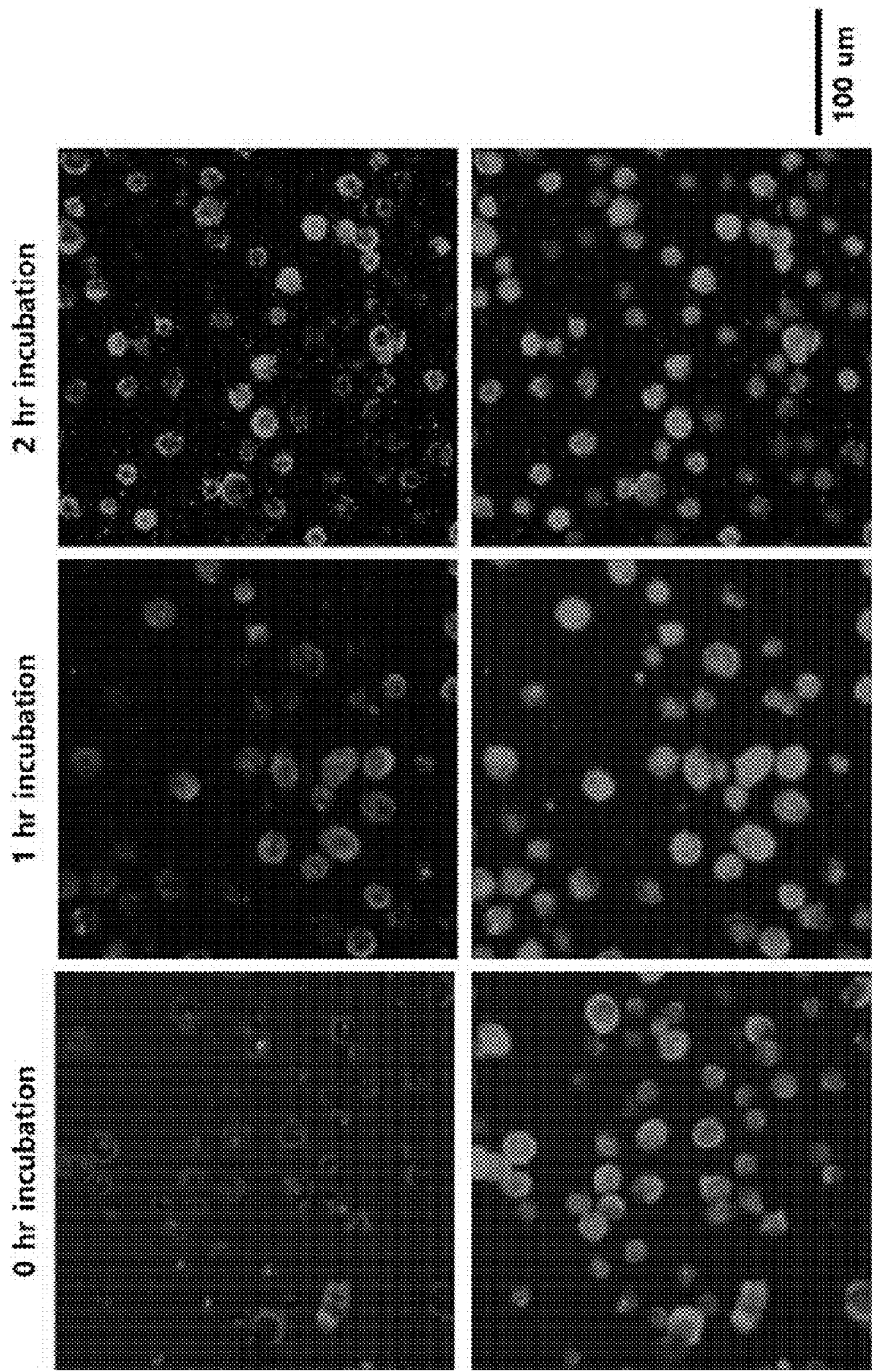
[FIG. 27]

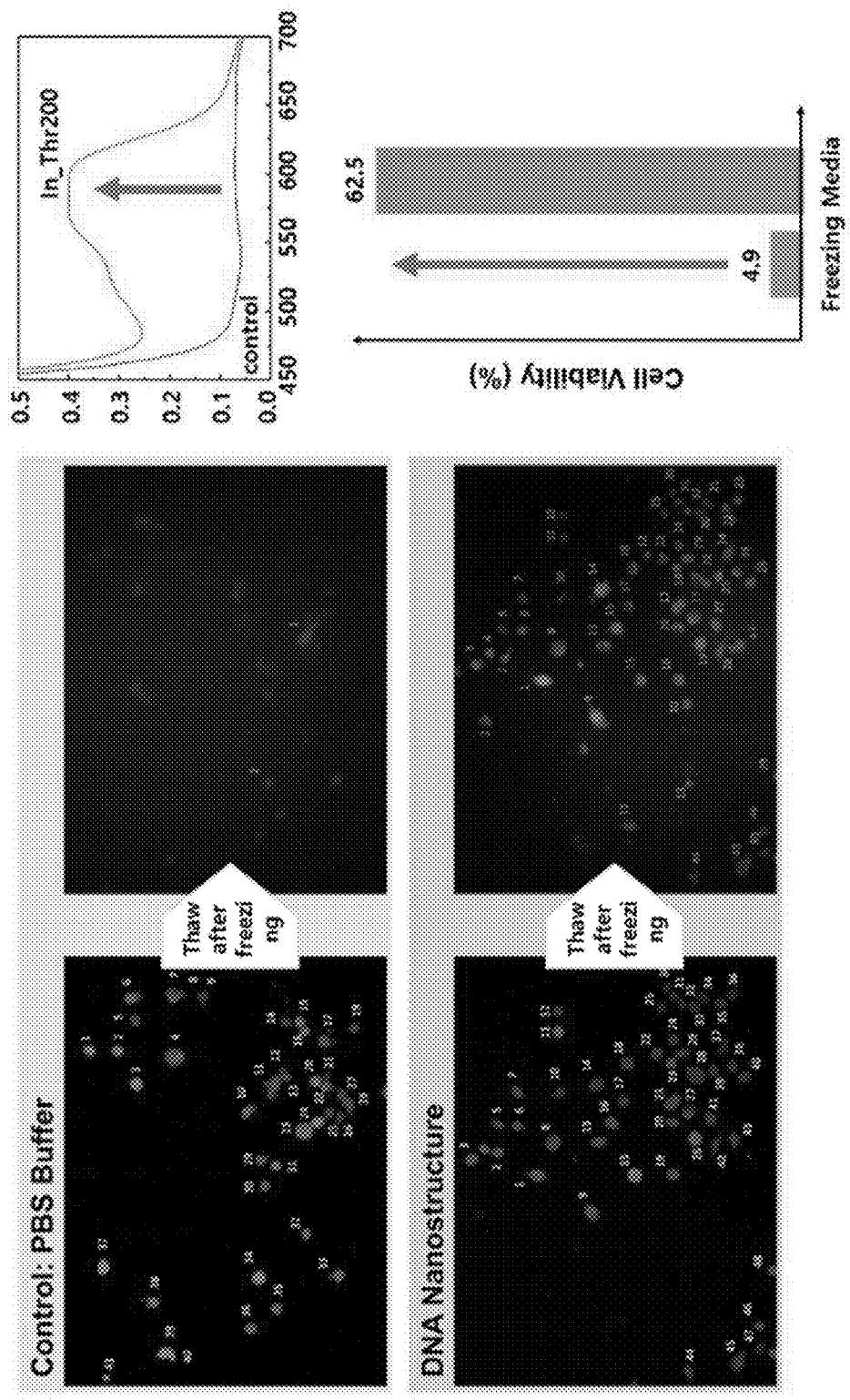
[FIG. 28]

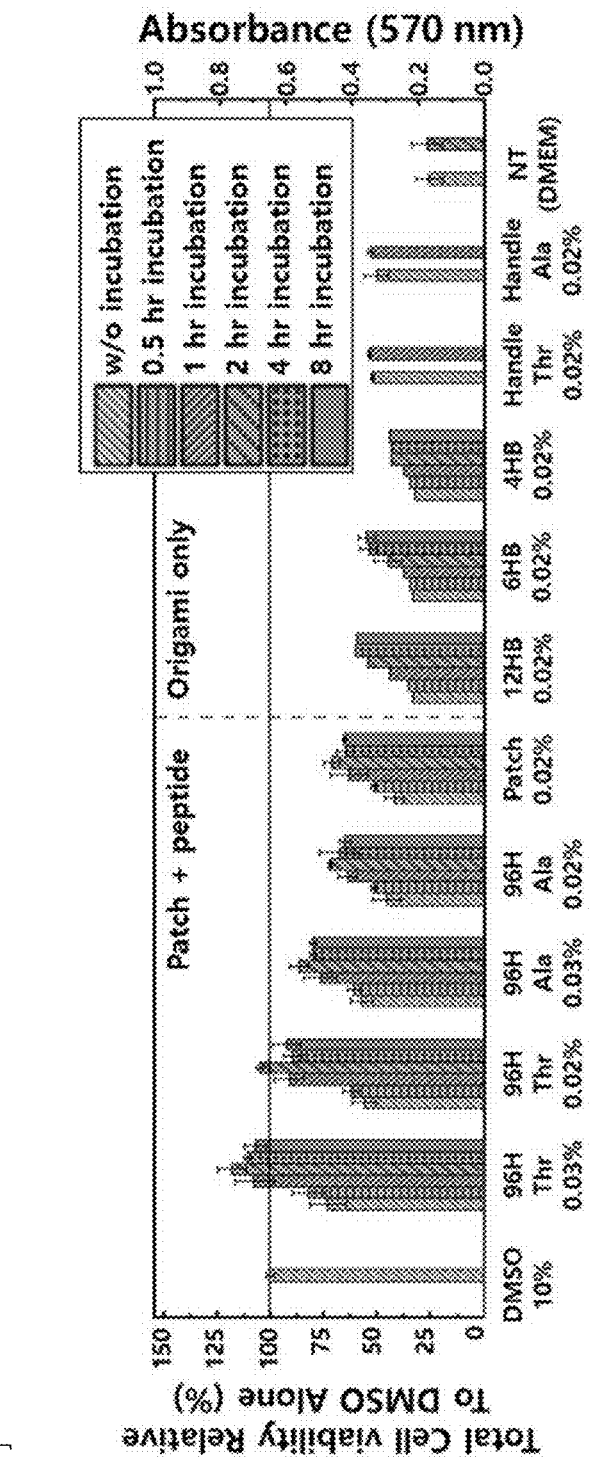
[FIG. 29]

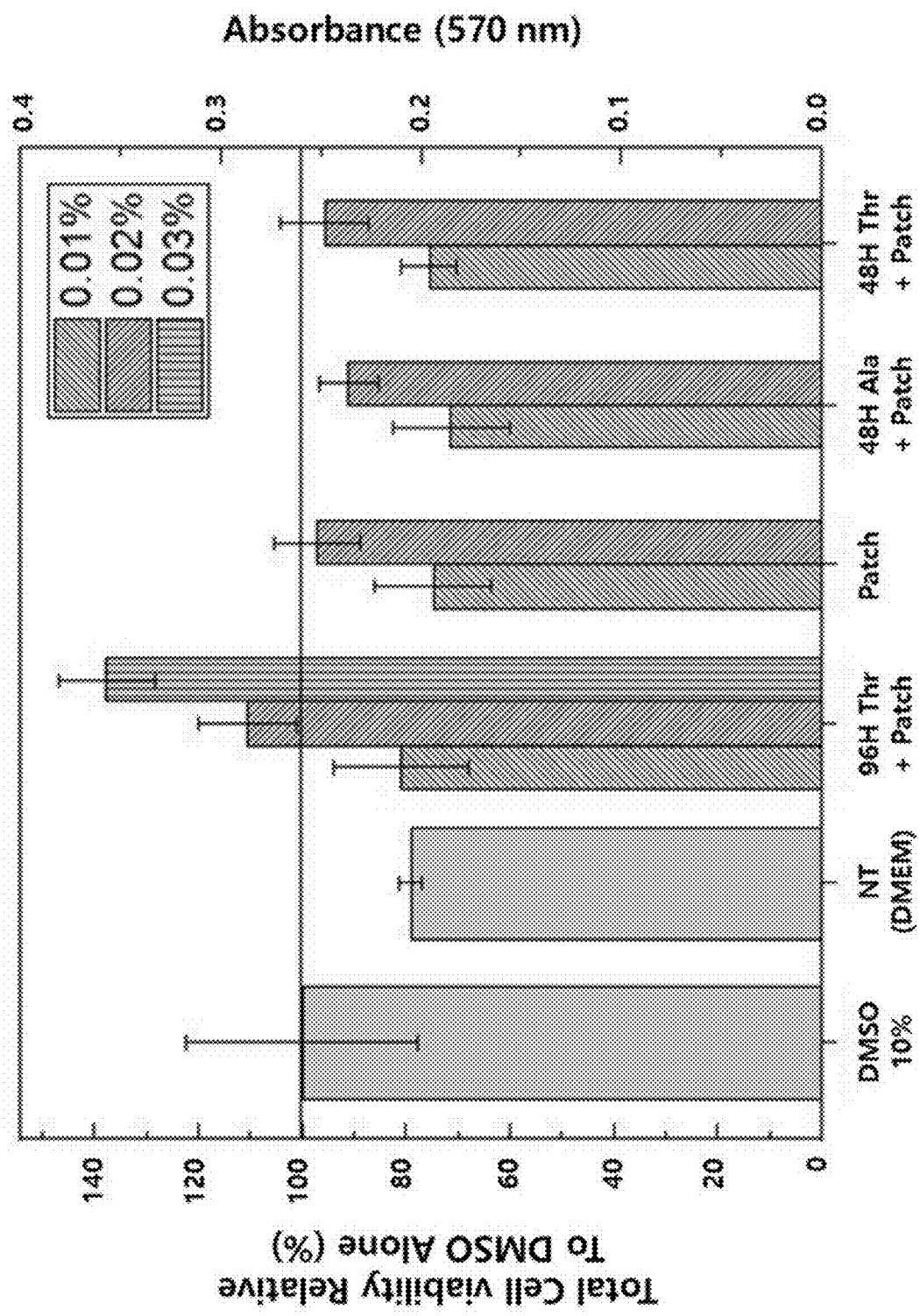
[FIG. 30]

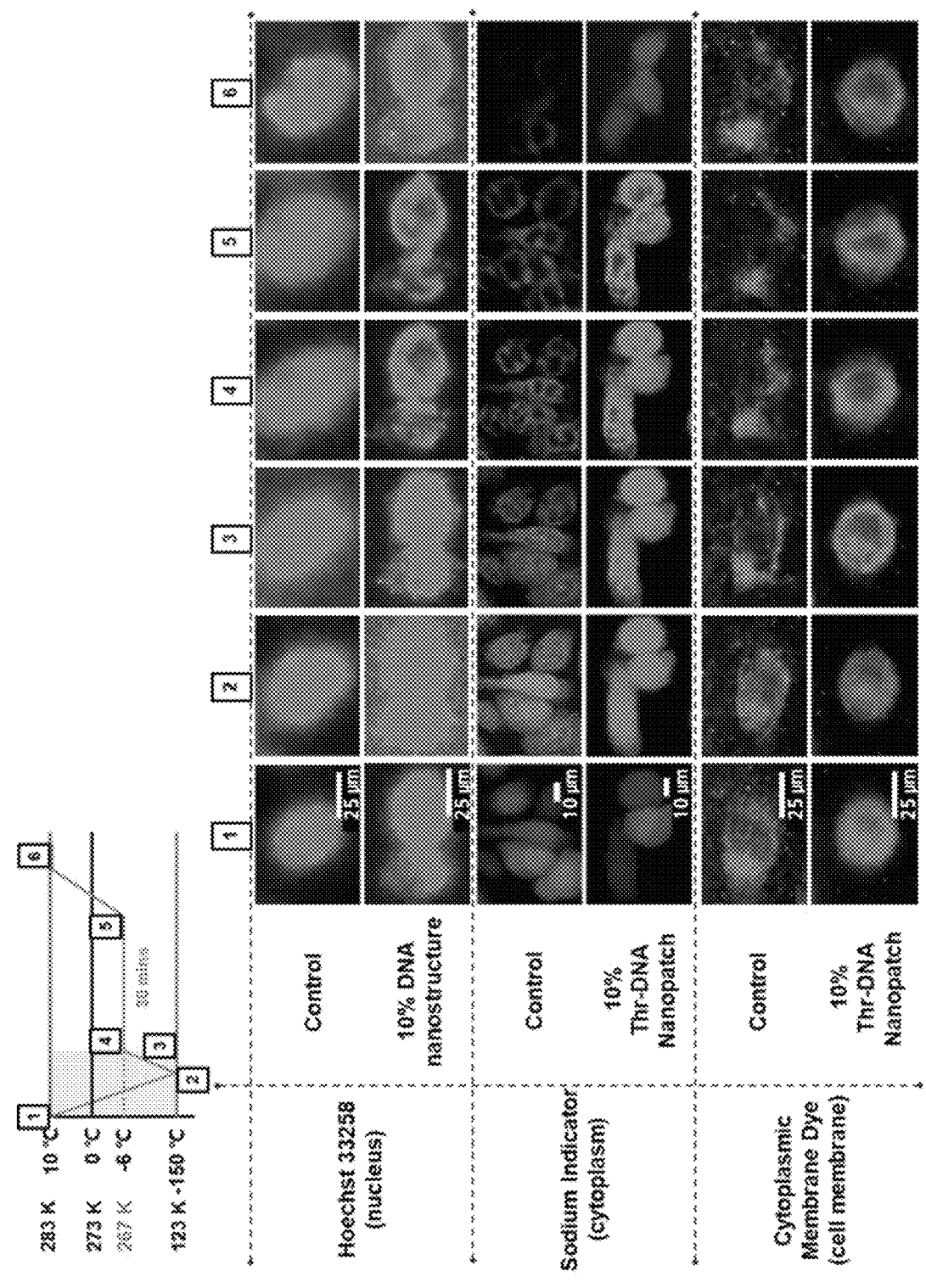
[FIG. 31]

COMPOSITION FOR CRYOPROTECTION INCLUDING DNA NANOSTRUCTURE, AND METHOD FOR USING SAME

CROSS REFERENCE TO RELATED APPLICATIONS

This application is a National Stage of International Application No. PCT/KR2021/003087 filed Mar. 12, 2021, claiming priority based on Korean Patent Application No. 10-2020-0168844 filed Dec. 4, 2020, the entire disclosures of which are incorporated herein by reference.

TECHNICAL FIELD

The present invention relates to a composition for cryopreservation comprising DNA nanostructure, and methods of using same.

BACKGROUND ART

An anti-freezing material refers to a compound capable of reducing or inhibiting ice crystal formation in a solution exposed to a temperature below zero (0) ° C. when present in the solution. At present, the anti-freezing material includes small molecules, synthetic polymer and anti-freezing protein. In the case of the small molecules used currently, very high valid concentration (for example, 60% or more) is required thus to sometimes cause tissue toxicity. Further, in the case of naturally existing proteins, it is difficult to perform purification and mass-production thereof, hence entailing a limitation of very high price of the product.

Life organisms living in an extremely low temperature ("cryogenic") environment contain anti-freezing proteins that prevent freezing of body liquid so as to protect cells and tissues. The anti-freezing proteins individually have inherent structures. However, it is known that a regular alignment in a peptide called threonine is engaged with a specific surface of an ice crystal and has effects of suppressing growth of the crystal.

DNA origami is a bottom-up fabrication technique for forming a nanostructure using complementary self-binding properties between four (4) unique bases of DNA, wherein the nanostructure is formed using a very long single DNA strand called a scaffold DNA, which usually has 7000 or more bases, and multiple short staple DNAs, which are used for conjugating the single stranded DNA in a specific shape.

Such DNA origami technology allows to produce two/three-dimensional nanostructures having a complex shape with a high precision within several nanometers (nm), which cannot be prepared by a conventional top-down fabrication technique. Through this technology, application of the nanostructure such as precisely arranging diverse nano-materials in desired positions may be possible. Further, the fabricated nanostructure may have very excellent bio-compatibility because of using bio-molecules.

Cryoprotectants act complexly inside and outside a cell. Specifically, a structure absorbed inside the cell suppresses formation and growth of ice crystals in the cell. On the other hand, a structure existing outside the cell suppresses formation and growth of ice cells around the cell, and prevents the cell from being damaged by ice crystals outside the cell to pierce a cellular membrane.

Meanwhile, in the case of dimethyl sulfoxide (DMSO) as one of the cell cryoprotectants commonly available in the art, this should be used in a great amount such that a mixing ratio of DMSO with a cell culture medium reaches about 10% (v/v). In addition, the above compound is a substance having cytotoxicity and adversely affects cell viability (survival rate), hence causing a problem in that it should be removed as soon as possible after thawing.

Further, prior studies on DNA origami materials to prove no occurrence of cytotoxicity have been disclosed, however, there is still not completely clarified whether cytotoxicity expressed or whether various types of cells have cytotoxicity when a peptide having anti-freezing ability is combined with the above DNA origami material. Therefore, for commercialization, assessment of the above tasks is further required.

SUMMARY OF INVENTION

Problems to be Solved by Invention

An object of the present invention is to provide a composition for cryopreservation of cells or tissues, comprising a DNA nanostructure.

In addition, another object of the present invention is to provide a composition for cryopreservation of food, comprising a DNA nanostructure.

Further, another object of the present invention is to provide a method for cryopreservation of cells or tissues.

Furthermore, another object of the present invention is to provide a method for cryopreservation of food.

Means for Solving Problems

To achieve the above objects, the following technical solutions are adopted in the present invention.

1. A composition for cryopreservation comprising: a nucleic acid structure which includes a scaffold nucleic acid folded at predetermined positions to form multiple strands, a plurality of first staple nucleic acids wherein at least a portion of a sequence thereof comprises a complementary sequence to that of the scaffold nucleic acid, which are bound to at least one of the strands of the scaffold nucleic acid to form a double strand, and a plurality of second staple nucleic acids wherein at least a portion of a sequence thereof is complementary to that of the scaffold nucleic acid but at least one end thereof is not complementary thereto, which are bound to at least one of the strands of the scaffold nucleic acid to form a double strand and a single strand at the end thereof;

linkers coupled to at least one of single strands in the nucleic acid structure; and an anti-freezing peptide coupled to at least one of the linkers.

2. The composition according to the above 1, wherein the linker is DNA, RNA or PNA.
3. The composition according to the above 1, wherein the linker has a length of 5 nucleotides to 20 nucleotides.
4. The composition according to the above 1, wherein the peptide has a length consisting of 1 to 10 amino acids.
5. The composition according to the above 4, wherein the amino acid is alanine or threonine.
6. The composition according to the above 1, wherein the nucleic acid structure comprises two or more helix bundles and a surface adapted to come into contact with ice crystals.
7. The composition according to the above 1, wherein the nucleic acid structure comprises a twisted or curved helix bundle.

8. A composition for cryopreservation of cells or tissues, comprising the composition according to any one of the above 1 to 7.
9. A composition for cryopreservation of food, comprising the composition according to any one of the above 1 to 7.
10. A method for cryopreservation of cells or tissues, comprising exposing subject cells or tissues to a temperature of below 0° C. in the presence of the composition according to the above 8.
11. A method for cryopreservation of food, comprising exposing subject food to a temperature of below 0° C. in the presence of the composition according to the above 9.

Advantageous Effects

The composition of the present invention has excellent freeze-protection ("cryopreservation") effects of cells and tissues.

Using the composition of the present invention may increase cell viability when cells are under cryopreservation.

The composition of the present invention has excellent food cryopreservation effects.

In food freezing using the composition of the present invention, the food may maintain the original texture thereof.

BRIEF DESCRIPTION OF DRAWINGS

FIG. 1 is a diagram illustrating a case in which a scaffold nucleic acid and staple nucleic acids bind to each other to form a structure.

FIG. 2 is diagrams illustrating several nucleic acid origami structures, wherein A is 4 helix bundle (rigid structure), B is 4 helix bundle (flexible structure), C is 24 helix patch (Rothemund square) structure, D is 12 helix bundle (rigid structure), E is 12 helix bundle (90 bent structure), and F is 12 helix bundle (45 bent structure).

FIG. 3 is a diagram illustrating 4, 6 and 12 helix bundle (HB)-rigid structures.

FIG. 4 is a diagram illustrating 4 helix bundle flexible structure, and 6 helix bundle flexible structure.

FIG. 5 is a diagram illustrating origami structures with or without a gap.

FIG. 6 is a schematic diagram illustrating a method for measuring recrystallization inhibition (RI) effects.

FIGS. 7 and 8 are photographs and a graph illustrating RI measurement results for a buffer solution containing only $MgCl_2$ in pure distilled water.

FIGS. 9 and 10 are photographs and a graph illustrating RI measurement results for a solution in which an unstructured single-stranded DNA is present.

FIGS. 11 and 12 are photographs and a graph illustrating RI measurement results of a scaffold DNA sample.

FIG. 13 is a diagram illustrating 4 helix bundle rigid structure and flexible structure.

FIG. 14 is a diagram illustrating 6 helix bundle rigid structure and flexible structure.

FIG. 15 is a diagram illustrating 24 helix patch structure.

FIG. 16 is a diagram illustrating 12 helix bundle firm structure and bent structures.

FIGS. 17 to 20 are photographs and a graph illustrating RI effects of DNA origami structures.

FIG. 21 illustrates a growth process of ice crystals over observation time, in regard to 6 helix bundle rigid structure.

FIG. 22 is a design diagram illustrating DNA-PNA-peptide patch.

FIG. 23 illustrates results of agarose-gel electrophoresis of the completed DNA-PNA-peptide patch.

FIG. 24 illustrates results of observing actual appearance of the DNA origami structure used in the experiment through atomic force microscopy (AFM).

FIG. 25 illustrates results of agarose-gel electrophoresis experiment wherein a stability test of the structure (a peptide-free patch structure) was conducted in a phosphate buffered saline (PBS) and a cell culture medium (Dulbecco's Modified Eagle's Medium, DMEM), respectively.

FIG. 26 illustrates results of agarose-gel electrophoresis experiment after the stability test of the structure (the peptide-free patch structure).

FIG. 27 illustrates the distribution of structures absorbed inside HSC-3 cells or adsorbed to an outside of the cells (violet: peptide patch, blue: nucleus).

FIG. 28 illustrates results of observing cell protection ability when thawed after freezing where DNA patch or a control (PBS buffer) is included.

FIG. 29 is a graph illustrating cell viability over incubation time of each of the origami structures (cryopreservation time is 24 hours which is the same in all cases), as compared to DMSO 10%.

FIG. 30 is a graph illustrating results of measuring cell viability after incubation for 24 hours and cryopreservation for 1 month.

FIG. 31 illustrates results of in-situ confirming cryopreservation effects of DNA origami.

MODE FOR CARRYING OUT INVENTION

Hereinafter, the present invention will be described in detail.

The present invention relates to a composition for cryopreservation ("cryopreservative composition"), including a DNA nanostructure.

As used herein, cryopreservation refers to protecting cells, tissues and/or food from freeze damage possibly occurring during cryopreservation of the cells, tissues and/or food.

As used herein, freeze damage refers to damage possibly occurring in cells, tissues and/or food when the cells, tissues and/or food are frozen. For example, damage to a cellular membrane may occur due to ice crystallization of water. In addition, when a non-invasive cryoprotectant is used, it affects only an extracellular salt concentration and thus the resulting high solute concentration may cause osmotic stress to the cellular membrane. Further, a high concentration cryopreservative needed for vitrification may cause damage due to low water chemical potential or chemical toxicity. However, it is not limited thereto.

In the present invention, cryopreservation may appear by combined action of DNA nanostructure inside and outside cells and tissues. For example, the structure absorbed inside the cell may inhibit formation and growth of ice crystals inside the cell, while the structure existing outside the cell may inhibit formation and growth of ice crystals around the cell, and prevent the cell from being damaged by ice crystals outside the cell to pierce the cellular membrane. However, it is not limited thereto.

The composition for cryopreservation of the present invention may include a material used to protect live tissues, cells or organisms and food from freeze damage.

According to an embodiment of the present invention, the composition for cryopreservation may inhibit formation or growth of ice crystals.

Ice crystals can grow through ice recrystallization, which refers to a process of growing from small ice crystals to larger ice crystals, and the growth thereof occurs according to Ostwald ripening mechanism. The Ostwald ripening may be performed in a dissolution-diffusion-refreezing or a sublimation-diffusion-condensation mechanism. In other words, the ice recrystallization does not occur as the ice crystals are adhered to each other, but rather as small ice crystals are melted between the crystals, and spread toward large ice crystals, thus to be a portion of large ice crystals while refreezing.

Inhibition of growth of ice crystals refers to actions of preventing ice formation, lowering a speed of ice formation, preventing ice recrystallization, lowering a speed of ice recrystallization, or maintaining a size of ice crystals to be small.

The composition for cryopreservation of the present invention may prevent freezing of cells or tissues. Further, when thawed after cryopreservation of cells, cell viability may be improved.

Effects of preventing and suppressing freezing of cells or tissues may vary depending on an extent of icephilic properties in relation to types and configuration of bases to construct the DNA nanostructure included in the composition.

The composition for cryopreservation of the present invention may include a nucleic acid structure.

The nucleic acid structure may be a nucleic acid origami structure.

The nucleic acid may be DNA, RNA or PNA, but it is not limited thereto.

The nucleic acid origami structure is a structure formed by folding predetermined portions of a scaffold nucleic acid (DNA scaffold in FIG. 1) while binding to a plurality of staple nucleic acids, as shown in FIG. 1.

The scaffold nucleic acid is a single-stranded nucleic acid, of which length may be appropriately selected depending on a length, size, shape, etc. of the structure to be formed, and a type of acid having a length of about 7000 to 8000 nucleotides (nt) may be used. In a specific embodiment of the present invention, M13mp18 DNA having a length of 7,249 nt was used, but it is not limited thereto. When preparing the DNA structure using M13mp18 scaffold DNA, the molecular weight of the resulting structure is about 5 megadaltons, which corresponds to about $10^{-20}$ kg, but it is not limited thereto.

In the staple nucleic acids, at least a portion of the sequence thereof has a complementary sequence to the scaffold nucleic acid, thereby allowing the scaffold nucleic acid to be folded or immobilized at specific positions.

In the present invention, the staple nucleic acid may be a plurality of staple nucleic acids (hereinafter, referred to as "first staple nucleic acids"), which are bound to at least one of the strands of the scaffold nucleic acid to form a double strand. Further, the staple nucleic acid may be a plurality of staple nucleic acids (hereinafter, referred to as "second staple nucleic acids"), wherein at least a portion of a sequence thereof is complementary to that of the scaffold nucleic acid but one end thereof is not complementary thereto, which are bound to at least one of the strands of the scaffold nucleic acid to form a double strand and a single strand at the end thereof.

The first staple nucleic acid may have a complementary sequence to that of the scaffold nucleic acid, and thus may be bound to the scaffold nucleic acid to form a double strand.

The second staple nucleic acid may include a portion having a complementary sequence to that of the scaffold nucleic acid and another portion which is not complementary to the scaffold nucleic acid at at least one end on a side ("one end"). For example, the one end may be not complementary to the scaffold nucleic acid or both ends may be not complementary to the scaffold nucleic acid, however, it is not limited thereto.

In the present invention, the staple nucleic acid may include a plurality of first staple nucleic acids alone, a plurality of second staple nucleic acids alone, or the plurality of first and second staple nucleic acids together, but it is not limited thereto.

The staple nucleic acid may have a length properly selected on the basis of a length, size or shape of a structure to be formed, for example, the length may range from 20 to 50 nt, but it is not limited thereto.

In the present invention, at least one end portion of the second staple nucleic acid not complementary to the scaffold nucleic acid may be a portion designed so that at least one end of a base sequence of the staple nucleic acid is not complementarily bound to a base sequence of the scaffold nucleic acid by extending a length of a portion of the base sequence of the staple nucleic acid when designing the base sequence. When the second staple nucleic acid is bound to the scaffold nucleic acid, the at least one end described above may be exposed to one side of the nucleic acid origami, which is hereinafter referred to as a "handle". The nucleic acid origami structure is a specific structure formed by binding the staple nucleic acids to specific positions of the scaffold nucleic acid and folding the staple nucleic acids at the specific positions, and the staple nucleic acids are designed so that the scaffold nucleic acid has such a specific structure.

The design of the staple nucleic acid may be performed according to a conventional method, and for example, a design program such as caDNAno may be used, but it is not limited thereto.

The nucleic acid origami structure may be prepared using conventional thermal annealing techniques.

This technique starts by heating the scaffold nucleic acid and staple nucleic acids as raw materials to a high temperature (for example, 80 to 95° C.), so that all nucleic acid strands are in a single-stranded state. The nucleic acid strand has a melting temperature according to a base sequence thereof, and in a case of above the melting temperature, the nucleic acid exists mainly as a single strand, and in a case of below the melting temperature, the nucleic acid exists mainly as a double strand. When slowly lowering the temperature of the reaction solution, the nucleic acid strands start to exist as the double strand while complementarily binding, and in the nucleic acid origami, about 200 staple nucleic acids bind to the designed positions while cooperatively binding, thereby creating a structure having a desired shape.

Since the respective staple nucleic acids have different base sequences, times of binding are slightly different from each other. However, because the conventional thermal annealing technique allows the temperature to be gradually lowered over a sufficient time (more than several hours), a condition, in which all the staple nucleic acids are sufficient to bind, is formed, and therefore, it is possible to prepare a structure so as to have the desired shape regardless of the base sequences.

The scaffold nucleic acid is folded at the predetermined positions to form a plurality of strands, and the staple nucleic acids have sequences designed so as to allow the scaffold nucleic acid to be folded at the predetermined positions. Therefore, the scaffold nucleic acid forms a predetermined structure while the staple nucleic acids bind to the scaffold nucleic acid by the above method.

The scaffold nucleic acid strands and the staple nucleic acids may bind to each other to form double strands (double helices), wherein the nucleic acid origami structure may have, for example 2 to 50, 2 to 45, 2 to 40, 2 to 35, 2 to 30, 2 to 25, 2 to 20, 2 to 12, or 4 to 12 helix bundles, and specifically may have 4 to 12 helix bundles, but it is not limited thereto. FIGS. 2 and 4 illustrate nucleic acid origami structures having various numbers of helix bundles.

A linker may be bound to at least one of the single strands in the nucleic acid structure. Specifically, the linker may be bound to at least one among the single strands existing at an end of the second staple nucleic acid, but it is not limited thereto.

The linker may be any nucleic acid of which at least a portion has a complementary base sequence at the handle, and may include nucleic acid strands, for example, DNA, RNA, PNA, etc., but it is not limited thereto. The linker may be a strand to which a functional material such as phosphor, peptide, etc. is additionally attached, but it is not limited thereto.

The linker is bound to at least one among the handles described above, may be bound to one or multiple or all of handles, but it is not limited thereto.

A length of the linker may be properly selected on the basis of a length of the handle, the configuration of base and a length, size, shape, etc. of the structure to be formed. For example, the length of the linker may range from 5 nucleotides (nt) to 50 nt, specifically, 5 nt to 30 nt, but it is not limited thereto.

In the present invention, an anti-freezing peptide may be a peptide bound to at least one among the above linkers.

The anti-freezing peptide may be bound to at least a portion of the linker. The at least a portion of the linker refers to one or multiple strands among single strands of the nucleic acid structure or the entire or a portion of a whole base sequence of one among the linkers. For example, the peptide may be bound to one end of the linker or to both ends of the linker. Binding between the linker and the anti-freezing peptide may be performed through a hydrogen bond, covalent bond, peptide bond, or the like, but it is not limited thereto.

In one embodiment of the present invention, a linker having a complementary base to a base sequence of the handle portion (for example, peptide nucleic acid strand (PNA)) may be designed, and peptide can be bound to at least one of the linkers (hereinafter, referred to as a "probe"). The probe may be bound to the handle as a portion designed when forming a nucleic acid origami structure in an aqueous solution (see FIG. 24).

As used herein, the peptide refers to a peptide having anti-freezing effects. Effects of suppressing the growth of ice crystals may vary according to an extent of icephilic properties based on types of the peptide and a density of peptide arrangement.

In one embodiment of the present invention, the peptide may include a single or combined type of amino acid polymers. The amino acid may have anti-freezing effects. For example, the amino acid may include alanine or threonine, but it is not limited thereto.

A length of the amino acid polymer may be properly selected on the basis of a length and base configuration of the linker, a length or base configuration of the exposed single strand, a length and size, shape, etc. of the structure to be formed. For example, the length of the amino acid polymer may range from 1 to 20 amino acids, 1 to 10 amino acid, or 2 to 10 amino acids, but it is not limited thereto.

In the nucleic acid origami structure of the present invention, the anti-freezing peptides may be aligned at a predetermined interval. In one embodiment of the present invention, an arrangement of anti-freezing peptides may be formed on one side of the nucleic acid origami structure.

As the origami structure has many more handles, the number of anti-freezing peptides attached to the handles may also be increased, thereby improving anti-freezing effects. In one embodiment of the present invention, an origami structure having an arrangement of 96 anti-freezing peptides at an interval of 16 nt, which is present in a transversal direction at one side of a nucleic acid origami sheet structure (a structure in which anti-freezing peptides are aligned at all handle portions in FIG. 22), exhibited higher cell viability than an origami structure having an arrangement of 48 anti-freezing peptides at an interval of 32 nt in the transversal direction (see FIG. 29).

The structure of the present invention may be absorbed inside a cell or adhered to an extracellular wall so as to enclose the cell. A material absorbed inside a cell may suppress formation and growth of ice crystals generated inside the cell during freezing/thawing the cell. Further, the material absorbed inside the cell may prevent and inhibit cells and tissues from being frozen. Further, when cells are thawed after cryopreservation, cell viability may be improved.

The structure adhered to the outside of a cell may suppress formation and growth of ice crystals generated around the cell, inhibit penetration of the ice crystals into the cell, and protect a cellular membrane from being damaged. Further, the structure adhered to the outside of a cell may prevent and inhibit cells and tissues from being frozen, and prevent damage to the same. Further, when cells are thawed after cryopreservation, cell viability may be improved.

The structure used in the present invention may have a weight/volume ratio (percent) of 0.001% to 0.03% in an aqueous solution, and 0.001% to 0.003% in a cell culture medium.

As compared to permeable small molecules used for existing tissue preservation that require a high weight/volume ratio of up to several tens of percent, the nucleic acid structure of the present invention may have ice crystal growth inhibitory effects even at considerably lowered weight/volume ratio, and may further exhibit anti-freezing effects of cells or tissues. Further, when cells are thawed after cryopreservation, cell viability may be improved.

In this regard, the nucleic acid origami structure according to the present invention may include a twisted or curved helix bundle.

For example, a direction in which the helix bundle is twisted may be controlled by an insertion or deletion of a base, and the bundle may be twisted in a right direction by inserting the base into the helix or may be twisted in a left direction by deleting the base. A degree of twisting may be controlled by the number of bases. The number of bases to be inserted or deleted may be one or two per every length of 21 bases in which the helix is rotated twice, and even if the number of bases exceeds the above range, there is no particular limitation as long as there is no problem in maintaining the structure.

Further, for example, the base is inserted into one helix of a plurality of helices, and the base is not inserted into other helices or the base is deleted so as to make a difference in the length between the helices, so that the helix bundle may be curved.

In addition, the nucleic acid origami structure may include a surface that can come into contact with an ice recrystallization surface in an aspect of inhibiting ice crystal formation or growth, that is, ice recrystallization. It is also possible to maximize the ice recrystallization inhibition effect by coming into contact the surface of the nucleic acid origami structure with the ice recrystallization surface over a large area in a form of a plane rather than a line. Further, the nucleic acid origami structure may a large area in the form of a plane, the anti-freezing effects of cells or tissues may be maximized.

Further, the present invention relates to a composition for cryopreservation of cells or tissues, including the composition described above.

When cryopreserving cells or tissues, cell membranes may be damaged due to ice recrystallization during melting the cryopreserved cells or tissues for subsequent use, thereby resulting in damaging the cells and tissues due to occurred cell dehydration. Organisms living in a lower-temperature environment may be more easily damaged by ice recrystallization.

The nanostructure included in the composition of the present invention may be absorbed inside the cells and tissues or adhered to extracellular walls of the cells and tissues so as to enclose food. A material absorbed inside cells and tissues may suppress formation and growth of ice crystals generated inside the cells and tissues during freezing/thawing the same. In addition, the material absorbed inside the cells and tissues may prevent and inhibit food from being frozen. Further, the structure adhered to the outside of the cells and tissues may prevent and inhibit the cells and tissues from being frozen, and further prevent damage to the same.

The composition of the present invention may be applicable to all cells that are commonly used by freezing for preservation, and may include, for example, prokaryotic cells; eukaryotic cells; microorganisms; animal cells; cancer cells, sperms; eggs; stem cells including adult stem cells, embryonic stem cells, and dedifferentiated stem cells; blood cells including cord blood, white blood cells, red blood cells, and platelets; and tissue cells including kidney cells, liver cells, and muscle cells, but it is not limited thereto.

In addition, the composition of the present invention may be applicable to all tissues that are commonly used by freezing for preservation, and may include, for example all tissues such as cornea, kidney, heart, small intestine, pancreas, lung, liver, and the like without limitation thereof.

The composition of the present invention may further include a preservative solution for cryopreservation of cells and/or tissues. The preservative solution may include, for example, water, saline, phosphate buffered saline (PBS), various cell culture media, but it is not limited thereto.

The composition of the present invention may include 0.001 to 0.5% (w/v) of the nucleic acid structure, and specifically 0.01 to 0.03% (w/v), but it is not limited thereto.

While the permeable small molecules used in the current tissue preservation process require a high weight/volume ratio of up to several tens of percent, the nucleic acid origami structure of the present invention may have ice recrystallization inhibition effects even in an extremely low content, which may be more advantageous for preservation upon freezing of cells and tissues. Further, when cells are thawed after cryopreservation, cell viability may be improved.

Further, the present invention relates to a method for cryopreservation of cells or tissues including exposing subject cells or tissues to a temperature below zero in the presence of the composition.

When freezing the subject cells or tissues in the presence of the composition, it is possible to prevent the cells or tissues from being damaged by inhibiting ice recrystallization at the time of subsequent thawing.

Further, the present invention relates to a composition for cryopreservation of food including the above composition, as well as a method for cryopreservation of food, which includes exposing subject food to a temperature of below zero (0° C.) in the presence of the above composition.

The composition of the present invention may be applied to all frozen foods, and when using the composition, it is possible to minimize a decrease in texture of the food at the time of subsequent thawing.

For example, the structure of the present invention may be absorbed into food or adhered to an outer wall of the food so as to enclose the food. A material absorbed into food may suppress formation and growth of ice crystals generated inside the food during freezing/thawing the same. In addition, the material absorbed in the food may prevent and inhibit food from being frozen. Further, the structure adhered to the outside of the food may prevent and inhibit the food from being frozen, and further prevent damage to the same.

Hereinafter, the present invention will be described in detail with reference to examples.

EXAMPLE

1. Identification of Ice Recrystallization Inhibition Effect by Cation and DNA Structure through Experiment
1.1 Experiment Method for Ice Recrystallization A splat cooling experimental technique commonly known in the art was used to measure the RI effect (see FIG. 6). First, a cover glass was placed on a metal plate pre-cooled with liquid nitrogen (temperature on the cover glass surface is about −150° C.), and 20 µl of a solution containing a material for measuring the RI effect dispersed therein was dropped at a height of about 1.5 m. As soon as the solution contacts the cover glass, it spreads thinly and freezes while being rapidly cooled, and a plurality of very small ice crystals are formed due to the rapid cooling. Then, the cover glass was transferred to a cold stage having drilled holes through which ice crystals can be observed with an optical microscope. The cold stage was maintained at −6° C., and a state, in which the ice crystals grow as small crystals gradually merge, was observed for 30 minutes. Thereafter, the sizes of the ice crystals were measured to compare how much the ice crystals have less grown compared to the control (a sample containing only solution without a freezing control material).

1.2. Observation of RI Effect in Cations-Containing Aqueous Solution and Unstructured DNA Sample First, RI measurement experiment was performed on a buffer solution containing only $MgCl_2$ in pure distilled water, and it was confirmed that ice recrystallization was inhibited as the ion concentration was increased (see FIGS. 7 and 8). Based on the results of this experiment, the $MgCl_2$ concentration of the reference buffer solution in the subsequent experiments was set to be 5 mmol (mM). RI performance of the sample was measured by comparing relative RI performance of the sample to the reference buffer, which means that the smaller value, the higher RI performance.

Next, RI measurement experiment was performed on a solution containing DNA in the unstructured single-stranded state. The concentration of DNA used in the experiment was set to be 50 to 200 ng/uL, which is similar to the concentration of DNA structures prepared through the conventional manufacturing processes. As a result of measuring the RI performance of a sample in which 169 types of staple DNAs forming 6 helix bundle rigid structure are mixed in a single-stranded state, it was observed to have a value of 0.87 to 1.0 with little ice recrystallization inhibition effect compared to the buffer (see FIGS. 9 and 10). In other words, it was experimentally confirmed that, although DNA strands have the effect of aggregating $Mg^{2+}$ ions, it is impossible to hold the $Mg^{2+}$ ions unless they form a structure having a constant shape and rigidity in an aqueous solution, thereby the RI effect hardly occurs at the macro level.

In addition, the RI value of the scaffold DNA sample performed in the same manner was measured up to about 0.7 (see FIGS. 11 and 12). The reason why the scaffold DNA has a slight RI performance compared to the staple DNA is assumed that, due to characteristics of the long scaffold DNA, it forms a secondary structure in which the entire region does not exist in the single-stranded state, but rather some portions bind in a double strand with complementary to each other.

1.3. Design of Structured DNA Origami

Thereafter, an experiment was performed on a DNA structure in which DNA strands are densely linked to each other thus to have constant cross-sectional shape and rigidity. 9 types of structures designed as an example of DNA origami technique include: (1) 4 helix bundle rigid structure; (2) 4 helix bundle flexible structure (gap 5 nt); (3) 6 helix bundle rigid structure; (4) 6 helix bundle flexible structure (gap 3 nt); (5) 6 helix bundle flexible structure (gap 5 nt); (6) 24 helix patches; (7) 12 helix bundle rigid structure; (8) 12 helix bundle bent structure (90°); and (9) 12 helix bundle bent structure (45°).

The design methods for each structure are as follows.

(1) 4 helix bundle rigid structure and (2) 4 helix bundle flexible structure (gap 5 nt)

The structures (1) and (2) have cross sections consisting of four double-stranded DNAs, of which one side is packed in a square shape of about 4.5 nm (FIG. 13). These have a structure in which the same forms of linkage are repeated based on a length of about 192 nt, and have a total length of about 600 nm, respectively. The rigid structure of (1) was designed so that opposite ends (5' end and 3' end) of all staple DNAs present in the structure are directly contact with each other, and the flexible structure of (2) consists of ssDNA in which a gap between opposite ends of 150 adjacent staple DNAs is 5 nt.

(3) 6 helix bundle rigid structure, (4) 6 helix bundle flexible structure (gap 3 nt) and (5) 6 helix bundle flexible structure (gap 5 nt)

The structures (3), (4) and (5) have cross sections consisting of six double-stranded DNAs, which are packed in a hexagonal shape (FIG. 14). These have a structure in which the same forms of linkage are repeated based on a length of about 168 nt, and have a total length of about 400 nm, respectively. The rigid structure of (3) was designed so that opposite ends of all staple DNAs present in the structure are directly contact with each other, and the flexible structures of (4) and (5) consist of ssDNA in which a gap between opposite ends of 169 adjacent staple DNAs is 3 nt and 5 nt, respectively.

(6) 24 helix patches

The structure (6) has a cross section consisting of twenty-four double-stranded DNAs, which are arranged in a straight line to form a sheet shape (see FIG. 15). The structure has a length of about 90 nm (256 nt) and a width of about 55 nm. This structure was designed so that all ends of the 192 staple DNA present in the structure directly contact with each other.

(7) 12 helix bundle rigid structure, (8) 12 helix bundle bent structure (90°), and (9) 12 helix bundle bent structure (45°)

The structures (7), (8), and (9) have cross sections consisting of twelve double-stranded DNAs, which are packed in a hexagonal shape (see FIG. 16). The rigid structure of (7) was designed so that all ends of 180 staple DNAs directly contact with each other. The structures (8) and (9) have flexible regions with a length of 42 nt by removing 11 staple DNAs present in the middle of the structure, and are formed in a shape in which the length of the DNA linking opposite ends of the structure was shortened to 357 nt and 189 nt, respectively, and a central portion thereof was bent at 90° and 45°, respectively.

1.4 Preparation of DNA Origami and Observation of RI Effect

Thereafter, the ice recrystallization inhibition effect of DNA structure structured so as to have constant cross-sectional shape and size was confirmed. A process for preparation of an origami structure is as follows: after admixing a raw material and the buffer then heating the mixture to 80° C., the temperature was lower to 65° C. over 1 hour, followed by a thermal annealing technique in order to reduce the temperature to 25° C. at 1° C. per hour. In order to separate the structure prepared by the thermal annealing technique, unreacted materials were filtered using a centrifugal purification filter manufactured by Amicon Co. A concentration of the structure after purification was measured using absorbance at a wavelength of 260 nm, followed by diluting the structure with the buffer in order to reach a target concentration.

The shape of the structure prepared according to the above design was measured by AFM (see first column images of FIGS. 17, 18 and 19). As a result of performing RI experiments on at least nine types of DNA structures having at least two types of different densities, RI value with a maximum of 0.53 was measured (see FIG. 20). The remaining samples exhibited higher RI performance than 4 helix bundle (samples 1 and 2) having the narrowest cross-sectional area, and the higher the concentration of the structure, the higher RI performance as a whole. This is believed that since the $Mg^{2+}$ ions can be sufficiently concentrated near the structures so that the RI performance may be exhibited when the cross-sectional area is at a certain level, and as the number of structures in the aqueous solution is increased, a region capable of inhibiting ice recrystallization is increased. With regard to 6 helix bundle rigid structure, as a result of observing the ice growing process after 30 minutes, it was observed that the ice is grown to a size similar to that of ice crystals in the buffer not containing the material after lapse of about 2 hours (see FIG. 21).

Through a series of experiments, it was demonstrated that the composition including the DNA structures in which cations were concentrated could exert higher ice recrystallization inhibition effects than DNA which does not form a structure.

2. Fabrication of DNA-PNA-Peptide Origami Structure 2.1. Designing DNA-PNDA-Peptide Origami Structure DNA-PNA-peptide structures having scaffold DNA, staple DNA, handle, Cy3 dye and PNA-peptide binding sites, respectively, were designed (see FIG. 22).

2.2. Fabrication of DNA-PNA-Peptide Origami Structure (see FIG. 23)

In order to fabricate a structure having a PNA-peptide probe attached thereto, all nucleic acid materials to construct the structure, that is, scaffold DNA, staple DNA including handle and PNA-peptide were mixed simultaneously. Thereafter, according to the same thermal annealing process as that in the fabrication of DNA origami structure, a DNA-PNA-peptide structure, in which the DNA-peptide probe is attached to the handle site of the DNA origami, was formed. The formed DNA-PNA-peptide structure was subjected to the same purification process as that used for the DNA origami structure.

3. Confirmation of Cell Protection Ability by DNA Structure
3.1. Experimental Material and Condition The present experiment was conducted using HSC-3 cells as cancer cells. A concentration of the nucleic acid origami structure used in the experiment was 100 ng/uL and 200 ng/uL, respectively. When a peptide probe was attached, the structure with a concentration of 300 ng/uL was used. By mixing the cell culture medium and the cryopreservative material in a ratio by volume of 9:1, a final material used for cell experiments was prepared with a concentration of 10 ng/uL to 30 ng/uL.

First, the nucleic acid origami structure was subjected to determination of freeze-protection effects of the structure only without the peptide probe. Thereafter, a PNA probe having anti-freezing peptides such as alanine and threonine adhered thereto was used to implement an experiment of measuring freeze-protection ability of DNA-peptide combined material.

The nucleic acid origami used for determining cell protection ability has the following shapes: (1) 4 helix bundle structure; (2) 6 helix bundle structure; (3) 12 helix bundle structure; and (4) 24 helix patch structure, respectively. Further, a shape of the structure formed according to the above designing process was confirmed by AFM (see FIG. 24).

3.2. Confirmation of Structure Stability Under Saline and Cell Culture Medium Condition In order to confirm whether the DNA origami structure can maintain the structure itself during interaction with cells, the DNA structure was admixed with 10% phosphate buffered saline (PBS) and DMEM cell culture medium in a ratio of 9:1, followed by incubation at 37° C. for maximum 8 hours.

In 1, 2, 4 and 8 hours, incubation was completed, followed by observing appearance of the DNA structure through AFM and agarose-gel electrophoresis so as to confirm structural stability thereof (see FIGS. 25 and 26).

3.3. Confirmation of Cell Absorption

Whether the prepared patch structure is absorbed to the inside/outside of the cell and attached thereto was monitored through a confocal fluorescence microscope (see FIG. 27.

As a fluorescent label, Hoechst 33258 was used for nucleus staining, while Cy3 was used as a DNA origami material. The nucleus was stained with blue while a place where the origami is located was indicated with magenta color.

A solution including DNA-PNA-peptide patch was mixed with a mixing ratio of 10% in the cell culture medium, followed by incubation. As a result of observing immediately after incubation, after 1 hour and after 2 hours, respectively, it was confirmed that an amount of the patch existing inside/outside the cell was gradually increased over the incubation time.

3.4. Confirmation of Cell Viability
3.4.1. Confirmation of Change in Cell Viability through Microscope when Thawed Immediately after Freezing First, the freeze-protection ability of a typical DNA patch structure was confirmed through the microscope. Then, after mixing cells with 10% PBS and the DNA patch structure and incubating the same, the mixture was subjected to freezing-thawing as like RI experiment, followed by confirming survival of the cells from images. As a result of the experiment, it was confirmed that all of the cells in PBS state were almost destructed but quite of the cells mixed with the DNA patch structure were survived (see FIG. 28).

3.4.2. Confirmation of Cell Viability through MTT Assay when Thawed after 24 Hours Cryopreservation.

Cell viability over time was confirmed when the cells were incubated in the cell culture medium including each DNA structure and each PNA-peptide bound thereto at 37° C. (see FIG. 29).

For samples including the patch (PNA-peptide probe), the highest cell viability was found when incubated for 2 hours. Among them, when the DNA structure with a probe having five (5) threonines (Thr×5) at a concentration of 300 mg/ul was incubated at a liquid nitrogen temperature for 2 hours and then thawed after 24 hours of cryopreservation, it showed the highest cell viability among all of the samples.

Meanwhile, for a bundle type structure, cell viability tended to increase over incubation time.

Cell viability was compared and determined between the origami structure samples and the cryoprotectant DMSO 10% (see FIG. 29).

The patch structure in a layer form showed the most excellent cell protection ability, and this is because the above structure has the widest cross-sectional area relative to the volume of material and flexibility, whereby the structure may efficiently interact with a cellular membrane thus to exhibit freeze-protection ability.

The material, in which alanine and threonine peptides are attached to a patch structure, was confirmed to have a much higher freeze-protection ability. From this result, it was confirmed that the peptide having freeze-protection ability exhibits excellent ice crystal formation and growth inhibitory performance inside and around the cells. In the case of a material to which threonine is attached using 96 probes, it was confirmed that this material has more excellent performance than DMSO 10% as a cryoprotectant commercially available in the art.

3.4.3. Confirmation of Cell Viability when Thawed after Long-Term Cryopreservation Based on the experimental condition of 2 hours incubation that showed the highest cell viability, in order to confirm cell viability at long-term cryopreservation for more than 24 hours, the cells were under cryopreservation at a liquid nitrogen temperature for 1 month and then thawed, followed by measuring cell viability (see FIG. 30).

As a result, it was confirmed that the DNA structure having Thr×5 probe has the highest cell viability, which is substantially the same as the result obtained after 24 hours cryopreservation. Further, it was also confirmed that the structure at 200 ng/ul and 300 ng/ul, respectively, still has higher performance compared to DMSO 10% control. From this result, it could be understood that the cryoprotectant using an origami structure may be used for long-term cryopreservation.

3.5. In-Situ RI and Confirmation of Cell Status

Similar to the experimental method described in Example 1.1, an experiment for determining RI performance of a material inside cells was conducted at −6° C. for 30 minutes. A nucleus portion (blue stained) of the cell, a cytoplasm portion (green) and a cellular membrane portion (red) were stained respectively, and characteristics thereof in relation to temperature change were observed by a fluorescence microscope. For the control (PBS buffer), a nucleus of the cell after low temperature freezing was damaged and had an irregular shape, therefore, it was difficult to find the nucleus. For the cytoplasm, a size of ice crystals inside the cell is rapidly increased during RI measurement, and the ice crystals are very little remained after thawing. Therefore, it could be confirmed that most of the cytoplasm disappeared due to cell damage. Further, it could be confirmed that the cellular membrane was initially distorted and then destructed (see FIG. 31).

In the case of the experimental group in which the patch structure at a concentration of 10% was admixed with the cell culture medium, it was confirmed that a nucleus of the cell undergone low temperature freezing was maintained similar to the initial stage. Further, the size of ice crystals inside the cell observed through the cytoplasm was quite smaller than that of the control, therefore, it was confirmed that the material has effects of suppressing the growth of ice crystals even inside the cell. Further, even when thawed after freezing, brightness of the cytoplasm was maintained, therefore, very little damage to the cells could be confirmed. Moreover, since fluorescent images of the cellular membrane are similarly maintained even after freezing and thawing, thereby observing cell freeze-protection effects of the material.

The invention claimed is:

1. A composition for cryopreservation comprising:
   a nucleic acid structure which comprises a scaffold nucleic acid folded at predetermined positions to form multiple strands, a plurality of first staple nucleic acids wherein at least a portion of a sequence thereof comprises a complementary sequence to that of the scaffold nucleic acid, which are bound to at least one of the strands of the scaffold nucleic acid to form a double strand, and a plurality of second staple nucleic acids wherein at least a portion of a sequence thereof is complementary to that of the scaffold nucleic acid but at least one end thereof is not complementary thereto, which are bound to at least one of the strands of the scaffold nucleic acid to form a double strand and a single strand at the end thereof;
   linkers coupled to at least one of single strands in the nucleic acid structure; and
   an anti-freezing peptide coupled to at least one of the linkers.

2. The composition according to claim 1, wherein the linker is DNA, RNA or PNA.

3. The composition according to claim 1, wherein the linker has a length of 5 nucleotides to 20 nucleotides.

4. The composition according to claim 1, wherein the peptide has a length consisting of 1 to 10 amino acids.

5. The composition according to claim 4, wherein the amino acid is alanine or threonine.

6. The composition according to claim 1, wherein the nucleic acid structure comprises two or more helix bundles and a surface adapted to come into contact with ice crystals.

7. The composition according to claim 1, wherein the nucleic acid structure comprises a twisted or curved helix bundle.

8. A composition for cryopreservation of cells or tissues, comprising the composition according to claim 1.

9. A composition for cryopreservation of food, comprising the composition according to claim 1.

10. A method for cryopreservation of cells or tissues, comprising exposing subject cells or tissues to a temperature of below 0° C. in the presence of the composition according to claim 8.

11. A method for cryopreservation of food, comprising exposing subject food to a temperature of below 0° C. in the presence of the composition according to claim 9.

* * * * *